United States Patent
Konno et al.

(10) Patent No.: US 11,881,643 B2
(45) Date of Patent: Jan. 23, 2024

(54) ELECTRICAL CONNECTION MEMBER, AND GLASS PLATE STRUCTURE WITH TERMINAL

(71) Applicant: SEKISUI POLYMATECH CO., LTD., Saitama (JP)

(72) Inventors: Hideaki Konno, Koshigaya (JP); Yasuyoshi Watanabe, San Jose, CA (US); Tsubasa Kamiya, Saitama (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 308 days.

(21) Appl. No.: 17/442,432

(22) PCT Filed: Mar. 6, 2020

(86) PCT No.: PCT/JP2020/009648
§ 371 (c)(1),
(2) Date: Sep. 23, 2021

(87) PCT Pub. No.: WO2020/203037
PCT Pub. Date: Oct. 8, 2020

(65) Prior Publication Data
US 2022/0190494 A1 Jun. 16, 2022

(30) Foreign Application Priority Data
Mar. 29, 2019 (JP) .................. 2019-069027

(51) Int. Cl.
*H01R 11/01* (2006.01)
*H01R 12/57* (2011.01)
*H01R 43/00* (2006.01)

(52) U.S. Cl.
CPC ............. *H01R 11/01* (2013.01); *H01R 12/57* (2013.01); *H01R 43/00* (2013.01)

(58) Field of Classification Search
CPC ......... H01R 11/01; H01R 12/57; H01R 43/00
(Continued)

(56) References Cited

U.S. PATENT DOCUMENTS

| 7,537,712 B2 | 5/2009 | Shima et al. |
| 2005/0057906 A1* | 3/2005 | Nakatani ................ H05K 3/321 |
| | | 29/830 |

(Continued)

FOREIGN PATENT DOCUMENTS

| JP | 2003-292781 | 10/2003 |
| JP | 2007-227111 | 9/2007 |

(Continued)

OTHER PUBLICATIONS

International Search Report (ISR) dated May 26, 2020 in International (PCT) Application No. PCT/JP2020/009648.

*Primary Examiner* — Andargie M Aychillhum
(74) *Attorney, Agent, or Firm* — Wenderoth, Lind & Ponack, L.L.P.

(57) ABSTRACT

Provided is an electrical connection member including a conductive member made of a rubber-like elastic material, through which a terminal used for supplying power is mounted to a mounted member such as a glass plate, and electrically connected with a small electric resistance to contact member provided in the mounted member, resulting in less reduction of rubber-like elasticity of the conductive member due to a temperature increase of the electrical connection member, even if large current flows.

With respect to the conductive member 11 made of the rubber-like elastic material provided in the electrical connection member 10, a compression set measured after the following treatment is 50% or less, the treatment being comprise applying a load between an upper surface and a lower surface of the conductive member and conducting 25% compressive deformation at 105° C. for 22 hours; and (Continued)

electric resistance between the upper surface and the lower surface is 0.1Ω or less during application of the load.

19 Claims, 6 Drawing Sheets

(58) Field of Classification Search
USPC .......................................................... 361/771
See application file for complete search history.

(56) References Cited

U.S. PATENT DOCUMENTS

| | | |
|---|---|---|
| 2005/0239940 A1 | 10/2005 | Shima et al. |
| 2007/0195512 A1 | 8/2007 | Konno |
| 2015/0133000 A1* | 5/2015 | Kim .................. H01R 13/2428 |
| | | 439/700 |
| 2015/0155646 A1 | 6/2015 | Takeuchi et al. |

FOREIGN PATENT DOCUMENTS

| | | |
|---|---|---|
| JP | 2012-43690 | 3/2012 |
| JP | 6070707 | 2/2017 |

\* cited by examiner (a)

(b)

(c)

ELECTRICAL CONNECTION MEMBER, AND GLASS PLATE STRUCTURE WITH TERMINAL

TECHNICAL FIELD

The present invention relates to an electrical connection member, and a glass plate structure with a terminal provided with the electrical connection member.

BACKGROUND ART

In a windowpane for an automobile, e.g., in order to provide a defroster, a defogger, etc., a feeding part composed of a conductive layer needs to be formed on a glass plate to electrically connect the feeding part with a terminal. To electrically connect the terminal to the feeding part, conventionally, soldering has been widely used. Also, as a substitute for soldering, as disclosed in e.g., Patent Literature 1, it has been considered to use conductive rubber. In Patent Literature 1, the conductive rubber is brought into contact with both of the feeding part and the terminal, and to hold the conductive rubber in a compressed state, the terminal is glued on the glass plate by using an adhesive composed of a thermosetting adhesive.

Further, as disclosed in Patent Literature 2, conventionally, a connector sheet including a sheet portion having an electrically insulating property and a conducting portion provided in the sheet portion is known. The connector sheet is used to electrically connect a metal portion constituting a housing of an electrical apparatus with a ground-connecting portion of a circuit board contained in the housing through the conducting portion, and is fixed on the circuit board through an adhesive portion etc.

CITATION LIST

Patent Literature

Patent Literature 1: JP 6070707 B
Patent Literature 2: JP 2007-227111 A

SUMMARY OF INVENTION

Technical Problem

In a case of electrically connecting between the feeding part of the glass plate and the metal terminal by using the conductive rubber, it needs to maintain its conductivity by holding the conductive rubber in the compressed state. When the conductive rubber is put in the compressed state, there may be a problem of peeling at an adhesive portion fixing the metal terminal due to repulsive force of the rubber. Furthermore, when a compression set of the conductive rubber is increased, it becomes difficult to make close contact with the feeding part or the metal terminal, resulting in increasing electric resistance of contact surfaces, and thus there may be a problem of increasing a temperature of an electrical connection part when large current flows.

Since the conductive rubber made of a rubber-like elastic material exhibits viscoelasticity, holding the conductive rubber in the compressed state at an elevated temperature for a long time leads to increased compression set and reduced rubber-like elasticity. As a result, in the conductive rubber with increased compression set, there may be a problem of increased electric resistance.

On the other hand, the connector sheet described in Patent Literature 2 is one which ground-connects the metal portion of the housing and the circuit board, and thus current does not essentially flow to the ground-connecting portion. It is difficult to use the connecter sheet described in Patent Literature 2 to electrically connect the metal terminal used for supplying power with the feeding part on the glass plate.

Therefore, an object of the present invention is to provide an electrical connection member having a conductive member made of a rubber-like elastic material, through which a terminal used for supplying power is mounted to a mounted member such as a glass plate, and is electrically connected with small electric resistance to a contact member provided on the mounted member, resulting in a small temperature increase of the electrical connection part, even if large current flows.

Solution to Problem

As a result of intensive research, the present inventors have found that the above problem can be solved by a conductive member made of a rubber-like elastic material of a predetermined structure, in an electrical connection member comprising the conductive member made of the rubber-like elastic material, and have completed the present invention. The present invention provides [1] to [13] below.

[1] An electrical connection member comprising a conductive member made of a rubber-like elastic material, the conductive member having at least an upper surface and a lower surface; wherein a compression set measured after the following treatment is 50% or less, the treatment being applying a load between the upper surface and the lower surface of the conductive member, and conducting 25% compressive deformation at 105° C. for 22 hours; and electric resistance between the upper surface and the lower surface is 0.1Ω or less during application of the load.

[2] An electrical connection member comprising a conductive member made of a rubber-like elastic material, the conductive member having at least an upper surface and a lower surface; wherein a compression set measured after the following treatment is 50% or less, the treatment being applying a load between the upper surface and the lower surface of the conductive member, holding the conductive member at 25% compressive deformation, removing the load applied to release compressive stress, again applying a load between the upper surface and the lower surface of the conductive member, and conducting 25% compressive deformation at 105° C. for 22 hours; and electric resistance between the upper surface and the lower surface is 0.1Ω or less during application of the load.

[3] The electrical connection member according to [1] or [2], wherein the electrical connection member comprises an adhesive member and a connecting member connecting the conductive member to the adhesive member; wherein the connecting member comprises an opening to fix the conductive member; and wherein the conductive member is fixed to the connecting member by bringing a side surface of the conductive member into contact with the opening of the connecting member.

[4] The electrical connection member according to [3], wherein a diameter of the opening of the connecting member is selected from a range of 50% to 200% of a conductible diameter of the conductive member.

[5] The electrical connection member according to [3] or [4], wherein an upper surface and a lower surface of the conductive member fixed in the opening of the connecting member protrude from an upper surface and a lower surface of the connecting member, respectively.

[6] The electrical connection member according to any one of [3] to [5], wherein with respect to a height direction of the side surface of the conductive member, a portion brought into contact with the opening of the connecting member includes a middle position of a height of the side surface.

[7] The electrical connection member according to any one of [1] to [6], wherein the conductive member is made of a cross-linked rubber-like elastic material that is conductive all over, and the conductive cross-linked rubber-like elastic material contains 50 to 90% by volume of conductive fillers.

[8] The electrical connection member according to any one of [1] to [6], wherein the conductive member comprises a columnar shape conductive portion made of a conductive rubber-like elastic material and an insulating portion made of an insulating rubber-like elastic material surrounding a circumference of the columnar shape conductive portion, and the conductive rubber-like elastic material forming the columnar shape conductive portion contains 25 to 80% by volume of conductive fillers.

[9] The electrical connection member according to [8], wherein the conductive fillers contained in the conductive rubber-like elastic material forming the columnar shape conductive portion are aligned in a height direction of the columnar shape.

[10] The electrical connection member according to any one of [1] to [9], wherein a conductible diameter of the conductive member exhibiting conductivity in a compressed direction when applying a load between the upper surface and the lower surface and compressively deforming the conductive member, is in a range of 1.2 mm to 5.0 mm, and wherein a ratio (an aspect ratio) of a height of the conductive member not in a state of compressive deformation to the conductible diameter of the conductive member is in a range of 0.1 or more and 1.5 or less.

[11] The electrical connection member according to any one of [3] to [10], wherein an upper surface and a lower surface of the connecting member comprise the adhesive members in a vertical direction so that each of an upper surface and a lower surface of the electrical connection member is adhesivable.

[12] A glass plate structure with a terminal, comprising a terminal, a glass plate provided with a contact member to be electrically connected to the terminal, and an electrical connection member making electrical connection between the terminal and the contact member, wherein the electrical connection member making electrical connection between the terminal and the contact member is the electrical connection member according to any one of [1] to [11], and wherein the electrical connection is made between the terminal and the contact member through a conductive member in a state of compressive deformation provided in the electrical connection member.

[13] The glass plate structure with the terminal according to [12], wherein the contact member, the terminal, and the conductive member are arranged at a position where compressive force in order to apply a load between the upper surface and the lower surface of the conductive member and to put the conductive member into a compressively deformed state is applied by the contact member provided on the glass plate, and the terminal, and wherein the electrical connection member is adhered to the glass plate provided with the contact member so that an arrangement of the contact member, the terminal and the conductive member is maintained.

Advantageous Effects of Invention

According to the electrical connection member having the conductive member made of the rubber-like elastic material of the present invention, it is possible to mount the terminal on the mounted member such as a glass plate, and to electrically connect the terminal in small electric resistance to the contact member provided on the mounted member, thereby reducing a temperature increase of the electrical connection part even if passing large current.

DESCRIPTION OF EMBODIMENTS

Figure 1:
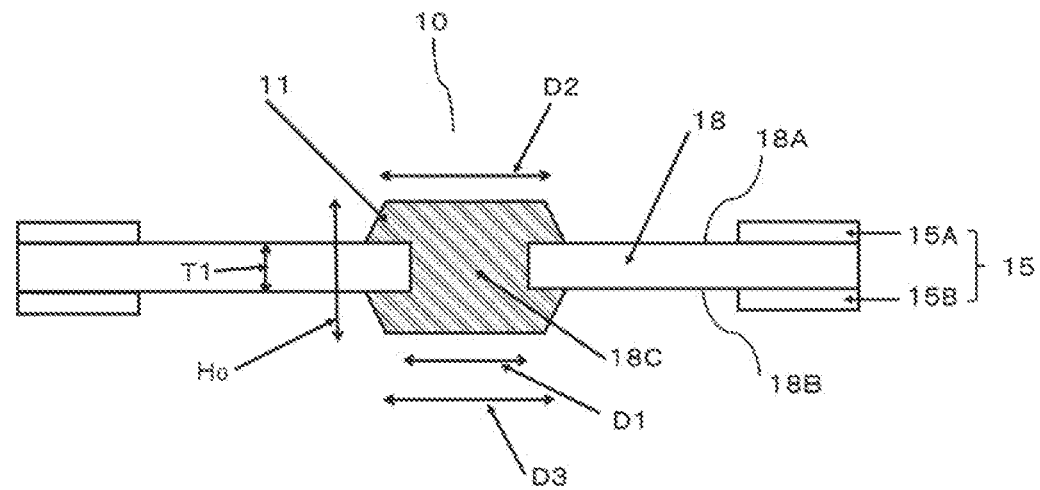
FIG. 1 is a sectional view showing one instance of a conductive member portion of an electrical connection member according to the first embodiment of the present invention.

An electrical connection member of the present invention is the electrical connection member including a conductive member made of a rubber-like elastic material, and the conductive member has at least an upper surface and a lower surface. In the electrical connection member of the present invention, a compression set (hereinafter, also referred to as "a first compression set") measured after the following treatment is 50% or less, wherein the treatment is applying a load between the upper surface and the lower surface of the conductive member and conducting 25% compressive deformation at 105° C. for 22 hours; and electric resistance between the upper surface and the lower surface is 0.1Ω or less during application of the load.

In a case that the compression set is more than 50%, when a temperature of the electrical connection member is increased due to, e.g., large current carried, rubber elasticity of the conductive member is reduced, to decrease close adhesion against an adherent, thereby becoming difficult to carry current stably.

To suppress reduction of the rubber elasticity and to carry current more stably, the compression set of the conductive member 11 is preferably 30% or less, more preferably 27% or less. The lower the compression set, the better. But for example, it is preferable that it is 7% or more practically.

Further, the compression set can be measured in accordance with JIS K6262: 2013, "Determination of Compression Set of Vulcanized Rubber and Thermoplastic Rubber at Ambient, Elevated and Low Temperatures."

Further, with respect to the conductive member, if electric resistance at 25% compression is larger than 0.1Ω, Joule heat generated when large current flows is increased, thereby increasing a temperature of the conductive member 11 compressively deformed. From a point of view of being able to suppress the Joule heat generated even if large current flows, the electric resistance at the 25% compression is preferably 50 mΩ or less, more preferably 20 mΩ or less. Also, the electric resistance at the 25% compression should be typically 0.1 mΩ or more in consideration with restrictions such as conductivity of the rubber-like elastic material itself used.

The electric resistance at the 25% compression can be measured by applying a load between the upper surface and the lower surface of the conductive member 11, passing electric current generated from a constant-current-power-supply between the upper surface and the lower surface at a state of the 25% compression, measuring a voltage difference between them at room temperature (23° C.), and calculating the electric resistance.

Further, when the conductive member is subjected to 25% compressive deformation at 105° C. for 22 hours, then returned to room temperature, and again subjected to the 25% compressive deformation, the electric resistance measured is preferably 0.1Ω or less, more preferably 50 mΩ or less. Thus, in the conductive member of the present invention, even after the 25% compressive deformation at 105° C. for 22 hours, the compression set becomes smaller as described above, thereby keeping low electric resistance.

In the electrical connection member of the present invention, after the conductive member is held at 105° C. for 22 hours in a state of the 25% compressive deformation, and after releasing the compressive stress, when the conductive member is again held at 105° C. for 22 hours in the state of the compressive deformation, it is preferably that newly occurred compression set (hereinafter, referred to as "a second compression set") is 50% or less. When the second compression set is 50% or less, even after the conductive member has been used for a long period time, the rubber elasticity of the conductive member is less likely to reduce, and the adhesion to the adherent is improved, thereby realizing more stable conduction. The second compression set is preferably 30% or less, more preferably 27% or less. Also, practically, it is 7% or more for example.

Hereinafter, the electrical connection member of the present invention will be described in detail with reference to embodiments.

First Embodiment

FIG. 1 shows an electrical connection member according to the first embodiment of the present invention. As shown in FIG. 1, the electrical connection member 10 according to the first embodiment includes a conductive member 11 made of a rubber-like elastic material, adhesive members 15, and a sheet-like connecting member 18 connecting the conductive member 11 to the adhesive members 15. As shown in FIG. 1, the connecting member 18 used for fixing the conductive member 11 is a flat sheet-like member, e.g., made of a resin sheet. In the connecting member 18, an opening 18C is provided, and the conductive member 11 made of the rubber-like elastic material is fixed by the opening 18C.

The conductive member 11 of the present embodiment is conductive all over and made of a cross-linked rubber-like elastic material. The conductive member 11 has an upper surface and a lower surface, and when applying a load between the upper surface and the lower surface, and conducting 25% compressive deformation, it exhibits at least conductivity. The adhesive members 15 are members to adhere an upper surface and a lower surface of the sheet-like connecting member 18 to other members, in order to maintain the conductive member 11 fixed in the opening 18C of the sheet-like connecting member 18 in an arrangement in which electrical connection is made.

When the rubber-like elastic material constituting the conductive member 11 is compressed by applying a load between the upper surface and the lower surface of the conductive member 11, it deforms in a state that the total volume of the conductive member 11 is maintained, resulting in bulging and deforming outward in a lateral direction of the conductive member 11. A side surface portion of the conductive member 11 is in contact with the opening 18C of the sheet-like connecting member 18, and the sheet-like connecting member 18 limits bulging and deforming the conductive member 11 laterally outward. That is, when the conductive member 11 is subjected to compressive deformation, a ratio of the portion bulging and deforming outward is limited. As a result, while holding at 105° C. for 22 hours in the state of the 25% compression, conversion from elastic deformation to plastic deformation can be suppressed.

Furthermore, by forming the opening 18C of the sheet-like connecting member 18 into contact with the side surface portion of the conductive member 11, when compressively deforming, the portions to be bulged and deformed to the outside of the conductive member 11 are limited to a portion upper from the upper surface and a portion lower from the lower surface of the connecting member 18. When compressive deforming, by utilizing a function of tightening the upper and lower divided portions due to the portion to be bulged and deformed of the conductive member 11, the conversion from the elastic deformation to the plastic deformation can be more efficiently suppressed.

As a result, in the first embodiment, the first compression set become 50% or less as described above, and the second compression set is also possible to be 50% or less.

Hereinafter, each member used in the present embodiments will be described in more detail.

(Connecting Member)

When compressively deformed by applying a compressive load between the upper surface and the lower surface of the conductive member 11 fixed by the opening 18C, the connecting member 18 is not particularly limited if it does not show diameter expansion of the opening 18C and reduction of a sheet thickness, and does have a certain strength supporting the compressively deformed conductive member 11. For example, the connecting member 18 is composed of a resin sheet which does not show the elastic deformation and the plastic deformation substantially when compressive stress is applied in a sheet thickness direction and its in-plain direction. Further, for the connecting member 18, used may be a resin sheet which does not show compressive deformation, but show flexibility, capable of flexure deformation.

As the resin sheet capable of use for preparing the connecting member 18, examples include a polyethylene terephthalate (PET) sheet, a polyethylene naphthalate sheet, a polycarbonate sheet, a polyetheretherketone sheet, a polyimide sheet, a polyamide sheet, a polyethylene sheet, a polypropylene sheet, a polyurethane sheet, etc. Among these resin sheets, from a point of view of durability, heat-resistance, etc., the PET sheet and the polyimide sheet are preferable. From points of view of position accuracy of the opening used for fixing the conductive member 11 and improving processing accuracy of the opening diameter, further, the polyimide sheet is preferable. Besides the resin sheets, used may be a metal sheet, a sheet made of wood or paper, a sheet made of a metal net or a resin net, etc.

A ratio of a thickness T1 of the connecting member 18 (the resin sheet) over a height $H_0$ of the conductive member 11 not compressed, $T1/H_0$, is, for example, preferably selected from a range of 0.05 to 0.50, more preferably selected from a range of 0.10 to 0.30. Setting the thickness ratio of the connecting member 18 within the above range prevents the conductive member from the plastic deformation, to become possible to reduce the compression set described above.

The thickness T1 of the connecting member 18 (the resin sheet) is not particularly limited, but e.g., 30 to 500 μm, preferably 50 to 350 μm.

(Conductive Member)

The conductive member 11 used for the electrical connection member 10 according to the first embodiment of the present invention has at least an upper surface and a lower surface, and exhibits conductivity when compressively deformed by applying a load between the upper surface and the lower surface.

The conductive member 11 used in the first embodiment of the present invention can be compressed by applying a load between the upper surface and the lower surface until a height H1 is compressed at least 25% with respect to an initial height $H_0$, i.e., to $0.75 \times H_0$ or less.

The conductive member 11 contains conductive fillers dispersed in the cross-linked rubber-like elastic material. With respect to the conductive member 11, a load is applied between the upper surface and the lower surface, and as a compressive deformation rate, $(H_0-H1)/H_0$, is increased, electric resistance between the upper surface and the lower surface is reduced. The cross-linked rubber-like elastic material itself is an insulating cross-linked rubber-like elastic material, but the compressive deformation causes mutual contacts of the conductive fillers dispersed, to form conductive paths, thereby reducing the electric resistance. Therefore, as described above, the electric resistance when compressed can be reduced.

For the conductive fillers, particles made of a highly conductive material can be used, and examples of outside shapes include particulate, fibrous, fragmentary, thin wire, etc. An average diameter of the conductive fillers contained in the conductive rubber-like elastic material is selected from a range of 1 to 200 μm, preferably selected from a range of 5 to 100 μm. Here, the average diameter of the conductive fillers means a particle diameter (D50) at 50% of a cumulative volume in particle distribution of effective diameters obtained by the laser diffraction and scattering method.

A highly conductive material used for the conductive fillers has electrical conductivity of about $10^6$ S/m, or more than that. Examples of the highly conductive materials include: a conductive carbon material such as graphite, conductive carbon black, and carbon fibers; a highly conductive metal such as gold, silver, platinum, aluminum, nickel, copper, iron, palladium, cobalt and chromium; an alloy such as stainless steel and brass; and further a magnetic conductive material such as e.g., nickel, cobalt, iron, ferrite, or an alloy containing a lot of them, or one which a highly conductive metal is plated on a surface of the magnetic conductive material, or one which a magnetic conductive material is plated on a surface of the conductive material. Moreover, a powder of the insulating material such as glass, resin, and ceramic coated with the highly conductive metal or the magnetic conductive material on the surface thereof can be also used as the conductive fillers.

When the magnetic conductive material, or one which the highly conductive metal is plated on surfaces of the magnetic conductive material, or one which the magnetic conductive material is plated on surfaces of the conductive material is used for the conductive fillers, the conductive fillers having magnetism, dispersed in the rubber-like elastic material are aligned in a chain along the magnetic moment when a magnetic field is applied from the outside. As a result of being aligned in a chain reaction along the magnetic moment, the conductive fillers having magnetism are in a state of mutual contact. In that state, when the rubber-like elastic material is cross-linked, the conductive fillers having magnetism, which are dispersed in the cross-linked rubber-like elastic material, are aligned in a chain reaction, to be held in the state of mutual contact.

When preparing the conductive member 11 made of the rubber-like elastic material containing the conductive fillers having magnetism, by aligning a direction (a height direction Z) of compressive stress applied on the upper surface and the lower surface with a direction of the magnetic moment due to external magnetic field, the conductive fillers having magnetism are aligned in a chain reaction in the direction (the height direction Z) of the compressive stress applied. In this manner, by aligning the conductive fillers having magnetism with the height direction Z, even if an amount of the compressive deformation due to the load applied between the upper surface and the lower surface is small, formation of the conductive passes is possible.

A content ratio of the conductive fillers dispersed in the cross-linked rubber-like elastic material that is conductive all over, is selected from a range of 50 to 90% by volume, preferably a range of 55 to 85% by volume, more preferably a range of 60 to 80% by volume.

The conductive member 11 is fixed to the connecting member 18 by bringing its side surface into contact with the opening 18C of the connecting member 18 (the resin sheet). In such case, the conductive member 11 is fixed to the connecting member 18 so that the upper surface and the lower surface of the conductive member 11 are respectively parallel to the upper surface and the lower surface of the connecting member 18.

Figure 2:
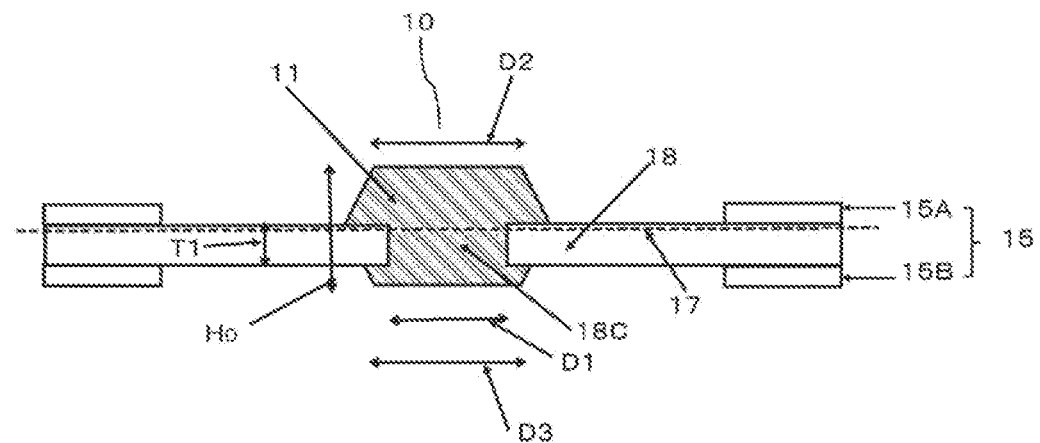
FIG. 2 is a sectional view showing another instance of the conductive member portion of the electrical connection member according to the first embodiment of the present invention.

When the side surface of the conductive member 11 is brought into contact with the opening 18C of the connecting member 18 (the resin sheet), it is preferable that the portion brought into contact with the opening of the connecting member 18 includes a middle position 17 of a side surface height. More preferably, as shown in FIG. 1, a mid-position of the opening 18C of the connecting member 18 coincides with the middle position 17 of the side surface height. In a case that the portion brought into contact includes the middle position 17 of the side surface height, particularly in a case that it coincides with the middle position 17 of the side surface height, when compressive load is applied to the conductive member 11, it can be more effectively suppressed to bulge and deform outward. As a result, the compression set of the conductive member 11 is more effectively suppressed. However, it is preferable if the portion brought into contact with the opening 18C of the connecting member 18 includes the middle position 17 of the side surface height, and as shown in FIG. 2, for example, it does not matter if the mid-position of the opening 18C of the connecting member 18 is misaligned with the middle position 17 of the side surface height.

Current passing the conductive member 11 that is conductive all over, of the present embodiment, is come in and out using the whole surfaces of the upper surface and the lower surface of the conductive member 11. Thus, a diameter D2 of the upper surface and a diameter D3 of the lower surface available for in and out of current to this conductive member 11 correspond to a conductible diameter $D_{effect}$ of the conductive member 11.

A diameter D1 of the opening 18C of the connecting member 18 is preferably selected from a range of 50 to 200% of the conductible diameter $D_{effect}$ of the conductive member 11, more preferably selected from a range of 60 to 150%. By setting it within the above range, the compression set and the electric resistance value can be reduced with balance.

The conductible diameter $D_{effect}$ is, e.g., 1.0 mm or more and 6.0 mm or less. By setting the conductible diameter $D_{effect}$ of the conductive member 11 within the above range, the electric resistance at the 25% compression can be in the range described above. As a result, at the 25% compression, it becomes possible to pass large current between the upper surface and the lower surface of the conductive member 11. From a point of view of suppressing a temperature increase of the conductive member 11 due to Joule heat generated by sufficiently reducing the electric resistance at the 25% compression even if passing large current, the conductible diameter $D_{effect}$ of the conductive member 11 is preferably selected from a range of 1.2 mm or more and 5.0 mm or less, more preferably a range of 1.5 mm or more and 3.5 mm or less.

Furthermore, the diameter D2 of the upper surface and the diameter D3 of the lower surface of the conductive member 11 can be respectively calculated as a diameter of a circle having an area equal to the upper surface area and a diameter of a circle having an area equal to the lower surface area. Also, in a case that the diameter D2 of the upper surface is different from the diameter D3 of the lower surface in the conductive member 11, the conductible diameter $D_{effect}$ of the conductive member 11 may be calculated as an average value (a geometric mean) of the diameter D2 of the upper surface and the diameter D3 of the lower surface.

On the other hand, after the opening 18C of the connecting member 18 (the resin sheet) having the thickness T1 is brought into contact with and fixed to the side surface of the conductive member 11, the initial height $H_0$ of the conductive member 11 is not particularly limited, as long as the compressive deformation of at least 25% is not prevented when applying a load between the upper surface and the lower surface. To reduce the electric resistance of the conductive member 11 at the 25% compression, a ratio of the initial height $H_0$ of the conductive member 11 over the conductible diameter $D_{effect}$ of the conductive member 11 (an aspect ratio ($H_0/D_{effect}$)) is, in the first embodiment, preferably 0.1 or more, more preferably 0.25 or more, even more preferably 0.5 or more, still more preferably 0.55 or more, and also preferably 1.5 or less, more preferably 1.45 or less, even more preferably 1.0 or less. The initial height $H_0$ of the conductive member 11 is preferably 0.50 mm or more, more preferably 0.60 mm or more, even more preferably 0.75 mm or more, and also preferably 7.50 mm or less, more preferably 5.25 mm or less, even more preferably 2.5 mm or less.

By setting the initial height $H_0$ of the conductive member 11 to these lower limit values or more, even if electrical connection is made at a state that the conductive member 11 is fully compressively deformed, the state that at least either of the upper surface and the lower surface of the conductive member 11 compressively deformed is protruded from the upper surface and/or the lower surface of the connecting member 18 is held. This state is held, thereby preventing bad electrical connection from occurring. Further, by setting the initial height $H_0$ of the conductive member 11 to these upper limit values or less, there is no need to keep apart more than necessary a distance between the terminal and the contact member such as the conductive layer, which are electrically connected through the electrical connection member 10.

As the cross-linked rubber-like elastic material, examples include e.g., thermosetting rubber. The thermosetting rubber is rubber that promotes cross-linking by heating and is cured. Specifically, examples include silicone rubber, natural rubber, isoprene rubber, butadiene rubber, acrylonitrile-butadiene rubber, styrene-butadiene rubber, chloroprene rubber, nitrile rubber, butyl rubber, ethylene-propylene rubber, acrylic rubber, fluororubber, urethane rubber, etc. Above all, preferable is the silicone rubber having excellent molding processability, electrical insulation, weather resistance, etc.

When preparing the cross-linked rubber-like elastic material that is conductive all over, one of the materials described above as a raw material of the rubber-like elastic material may be used alone, or two or more of them may be used together.

As a cross-linked rubber-like elastic material, for example, when the conductive fillers having magnetism are dispersed, and aligned in a chain reaction along the magnetic moment by applying the external magnetic field, preferable is one that liquid rubber in which the conductive fillers can flow, is cross-linked and cured. Further, the liquid rubber is, in not cross-linked state before cured, liquid at room temperature (23° C.) and under normal pressure (1 atm). As rubber, specific, used may be the liquid rubber in those recited as the thermosetting rubber, above all, preferable is liquid silicone rubber.

Hardness of the rubber-like elastic material is preferably A20 to A50, more preferably A25 to A40. By setting it within the above range, conversion from the elastic deformation to the plastic deformation may be prevented, and the compression set described above may be reduced. Here, the hardness of the rubber-like elastic material is measured by using a Type A Durometer at 23° C., in accordance with "Rubber, vulcanized or thermoplastic-Determination of hardness-Part 3: Durometer method" described in JIS K6253-3: 2012. This is a hardness of the rubber-like elastic material not containing the conductive fillers.

In the electrical connection member 10 according to the first embodiment of the present invention, the cross-linked rubber-like elastic material that is conductive all over is used in the conductive member 11, and a content ratio of the conductive fillers is selected from a range of 50 to 90% by volume, thereby being able to reduce the electric resistance when compressed.

In the electrical connection member 10 according to the first embodiment of the present invention, as shown in FIG.

6, a plurality of conductive members 11 can be provided. In a case that a plurality of conductive members 11 are provided, a plurality of openings 18C may be provided in the connecting member 18, and each conductive member 11 may be fixed in each opening 18C. By providing with a plurality of the conductive members 11, the terminal described below is parallelly electrically connected to the contact member such as the conductive layer through a plurality of conductive members 11. In a case that a plurality of conductive members 11 are provided, even if large current flows between the terminal and the contact member, the amount of current flowing in each conductive member 11 is suppressed in low, thereby suppressing a temperature increase due to Joule heat generated in each conductive member 11.

Thus, it may prevent the adhesive member 15 that adhere the mounted member (such as a glass plate described below) to which the contact member is mounted and the terminal, from becoming deteriorated due to a temperature increase of the electrical connection member 10, and also prevent the adhesive member 15 from peeling from the mounted member.

Further, by providing with a plurality of the conductive members 11 having a small area, rather than a single conductive member 11 having a large area, when compressing the conductive member 11 with a predetermined compressive strain, loaded points can be distributed. As a result, it is also prevented the adhesive member 15 that adheres the terminal from peeling due to a repulsive force of the conductive member 11.

Furthermore, in the conductive member 11 having the upper surface and the lower surface of large areas, when compressively deformed, a width of a bulged outer circumference portion is widened. When the width of the outer circumference portion is widened, a ratio of conversion from the elastic deformation to the plastic deformation is relatively increased, during the period that the temperature is held in the raised state. Thus, compared with the conductive member 11 having the upper surface and the lower surface of large areas, the compression set of the conductive member 11 having the upper surface and the lower surface of small areas becomes relatively small.

(Adhesive Member)

The adhesive members 15 are members for adhering the upper surface and the lower surface of the sheet-like connecting member 18 to other members, so as to maintain the conductive member 11 fixed in the opening 18C of the sheet-like connecting member 18 in an arrangement that electrical connection is made. Since the electrical connection member 10 includes the adhesive members 15, it makes it possible to securely and easily adhere the terminal to the mounted member (e.g., a glass plate) provided with the contact member, while electrically connecting between the terminal and the contact member such as a conductive layer. By utilizing adhesive force of the adhesive members 15, the conductive member 11 can be fixed in a compressed state, and the terminal or the like compressing the conductive member 11 is less likely to be peeled off from the mounted member.

In the electrical connection member 10 according to the first embodiment of the present invention, the upper surface 18A and the lower surface 18B of the sheet-like connecting member 18 are respectively provided with a first adhesive member 15A and a second adhesive member 15B.

In the following description, further, described will be about fixation of the electrical connection member 10 by using the adhesive members 15, exemplified by an embodiment that the contact member provided on the mounted member is in contact with the upper surface of the conductive member 11 and a surface of the terminal opposing the contact member is in contact with the lower surface of the conductive member 11.

The first adhesive member 15A and the second adhesive member 15B are respectively adhered to the upper surface 18A and the lower surface 18B of the sheet-like connecting member 18. To adhere to the upper surface 18A and the lower surface 18B of this sheet-like connecting member 18, e.g., adhesive layers can be utilized. The first adhesive member 15A and the second adhesive member 15B are respectively adhered to the mounted member provided with the contact member, and to an adhered position of the terminal. To adhere to this mounted member and the adhered position of the terminal, e.g., the adhesive layers can be also utilized.

The adhesive layer is ordinarily flexible, and is easy to deform following a shape of the mounted member and a shape of the adhered position of the terminal, which are targets to be adhered, when adhering and fixing. Also, the whole can be adhered with close contact even large in an adhering area. Thereby the sheet-like connecting member 18 can be fixed with a high adhesive force to both of the mounted member and the adhered position of the terminal.

Figure 5:
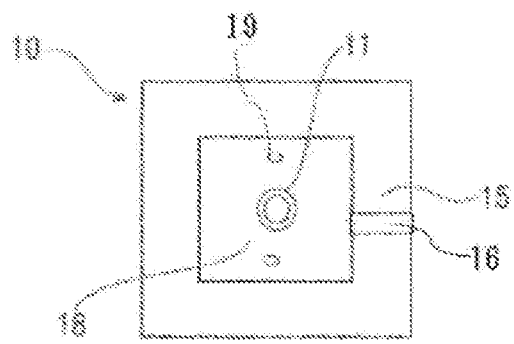
FIG. 5 is a plan view showing one instance of an electrical connection member having one conductive member.
Figure 6:
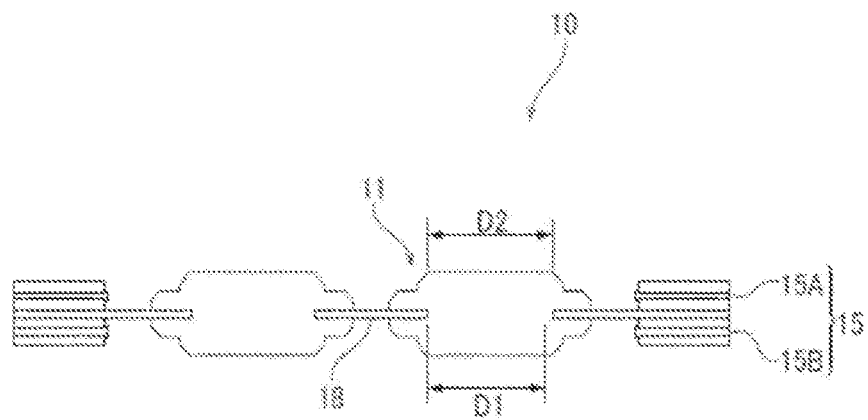
FIG. 6 is a sectional view showing a structure of an electrical connection member having a plurality of conductive members according to the first embodiment of the present invention.

In an example shown in FIG. 5, for example, the sheet-like connecting member 18 is formed in a square shape, and the conductive member 11 is fixed in its center. Conforming to its shape, the adhesive members 15 (the first adhesive member 15A and the second adhesive member 15B) are formed in a square frame shape. A tensile tension is given to the sheet-like connecting member 18 by the sum of adhesive force of the adhesive members 15 (the first adhesive member 15A and the second adhesive member 15B) arranged in the square frame shape, resulting in suppressing flexural deformation of the sheet-like connecting member 18 due to the compressive load applied to the upper surface and the lower surface of the conductive member 11. The compressive stress applied to the upper surface and the lower surface of the conductive member 11 fixed in the opening of the sheet-like connecting member 18 is offset by the sum of the adhesive force of the adhesive members 15 (the first adhesive member 15A and the second adhesive member 15B), and as long as the peeling of the adhesive members 15 is avoided, the shape may not be limited to the square frame shape, but be any shape such as rectangular.

A thickness of the adhesive layer used in the first adhesive member 15A and in the second adhesive member 15B is particularly not limited, respectively, but are e.g., 10 to 100 μm, preferably 20 to 80 μm.

As an adhesive constituting adhesive layers, a known adhesive can be used. Examples include an acrylic-based adhesive, a urethane-based adhesive, a silicone-based adhesive, a rubber-based adhesive, etc.

Further, the thickness of the adhesive layer used in the first adhesive member 15A may be smaller or larger than, or the same as a height from the upper surface of the connecting member 18 to the upper surface of the conductive member 11; and the thickness of the adhesive layer used in the second adhesive member 15B may be smaller or larger than, or the same as a height of from the lower surface of the connecting member 18 to the lower surface of the conductive member 11.

In the electrical connection member 10 according to the first embodiment of the present invention, in a case that a plurality of conductive members 11 are provided, it is preferable to provide the adhesive members 15 so as to surround a plurality of conductive members 11. At that time, in order to compressively deform a plurality of the conductive members 11, a contact area and adhesive strength of the adhesive used are selected so that the sum of the adhesive force of the adhesive members 15 (the first adhesive member 15A and the second adhesive member 15B) exceeds the sum of the compressive stress applied to each conductive member 11.

Figure 7:
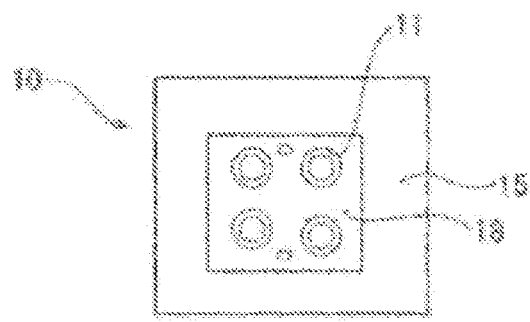
FIG. 7 is a plan view showing one instance of an electrical connection member having a plurality of conductive members.
Figure 8:
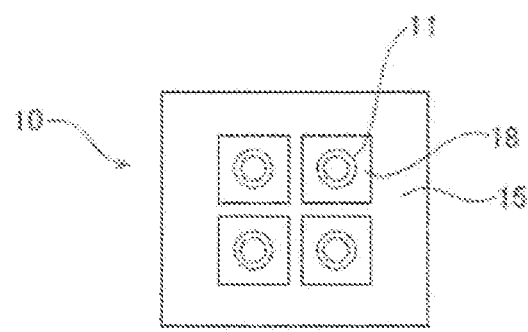
FIG. 8 is a plan view showing another instance of an electrical connection member having a plurality of conductive members.

In an example shown in FIG. 7, for example, in the central portion of the sheet-like connecting member 18 formed in square shape, four conductive members 11 are fixed symmetrically. Conforming to its shape, the adhesive members 15 (the first adhesive member 15A and the second adhesive member 15B) are formed in a square frame shape. In an example shown in FIG. 8, for example, in a central portion of the sheet-like connecting member 18 formed in square shape, four conductive members 11 are fixed symmetrically. Conforming to its shape, the adhesive members 15 (the first adhesive member 15A and the second adhesive member 15B) are formed in a square frame shape provided with four window open areas.

Further, any of spacings, $S1, S2, \ldots Sn$, between the adhesive members 15 (the first adhesive member 15A and the second adhesive member 15B) and each conductive member 11, is also e.g., 0.1 to 10.0 mm, preferably 0.5 to 5.0 mm. Here, the spacings $S1, S2, \ldots Sn$ (n means a number of conductive members 11 provided in the electrical connection member 10) mean the shortest distances between each conductive member 11 and the adhesive members 15 (the first adhesive member 15A and the second adhesive member 15B) surrounding that. By setting these spacings within the above range, a compressive load applied to each conductive member 11 is made uniform, the repulsive force due to the compressive load is easily to be distributed evenly in the whole adhesive members 15 surrounded. Further, it is preferable that the spacings $S1, S2, \ldots Sn$ are values that are close to each other. Therefore, the maximum value with respect to the minimum value of these spacings $S1, S2, \ldots Sn$, is preferably 3 times or less, more preferably 2 times or less, even more preferably 1.5 times or less.

The adhesive members 15 may be provided with an open portion without the adhesive members 15 by partially providing a thin cutout etc. and the cutout 16 may be used as a ventilation hole. Further, in the connecting member 18, in addition to a through-hole for the opening 18C, a small through-hole 19 having a small diameter may be provided in an unoccupied position. As a result, ventilation can be performed to the inner peripheral side and the outer peripheral side of the adhesive members 15, or to the upper and lower surfaces of the connecting member 18, and it becomes easy to fix to the mounted member and the terminal. Further, troubles such as peeling of the adhesive member 15 and poor conduction of the conductive member 11 caused by air expansion of the enclosed space can be avoided. Further, the through-hole 19 having a small diameter can be used as a positioning hole of the sheet-like connecting member 18 used at a time of work to fix the conductive member 11 to the opening, and at a time of work to form the adhesive members 15.

<Production Method>

Hereinafter, a production method of the electrical connection member 10 according to the first embodiment of the present invention will be described. First of all, in a production method of the conductive member 11 fixed in the opening 18C of the connecting member 18, prepared is a metal mold corresponding to an outer configuration of the conductive member 11 to be produced. The metal mold is composed of an upper mold and a lower mold, made of a non-magnetic material such as aluminum and copper. In the upper and lower molds used, the arrangement of the upper surface of the conductive member 11, the opening 18C of the connecting member 18, and the lower surface of the conductive member 11 can be determined so that the opening 18C of the connecting member 18 is in contact with the side surface of the conductive member 11 to be produced.

Further, a resin sheet for constituting the connecting member 18 is provided. The resin sheet may be prepared by punching etc. to form a through-hole, which is to be utilized as the opening 18C. The resin sheet in which the through-hole was formed is inserted in the metal mold, and liquid rubber to be a raw material of a cross-linked rubber-like elastic material that is conductive all over is injected in a cavity. In the liquid rubber, particles composed of a conductive material utilized as the conductive fillers are mixed in advance.

After that, the upper and the lower metal molds are completely clamped to perform heating treatment, and the liquid rubber is cross-linked and cured. The conductive member 11 made of the cross-linked rubber-like elastic material that is conductive all over, integrally fixed in the opening 18C of the sheet-like connecting member 18 is obtained. After that, the electrical connection member is obtained by attaching the adhesive members 15 to this connecting member 18 using a known method.

Particularly when the magnetic conductive particles are adopted as the conductive fillers, pins made of a ferromagnetic material such as iron and a magnet are implanted into positions corresponding to respectively the upper surface and the lower surface of the conductive member 11, in the upper metal mold and the lower metal mold. One end of each pin becomes exposed on each cavity surface of the upper mold and the lower mold.

A resin sheet for constituting the connecting member 18 is provided. A resin sheet may be prepared by punching etc. to form a through-hole, which is to be utilized as the opening 18C. The resin sheet in which the through-hole was formed is inserted in the metal mold, and liquid rubber to be a raw material of a cross-linked rubber-like elastic material that is conductive all over is injected in a cavity. In the liquid rubber, the magnetic conductive particles utilized as the conductive fillers having magnetism are mixed in advance.

Next, an external magnetic field is applied from above and below the metal mold using a magnet. In the cavity, a parallel magnetic field that connects one pin to the other pin is formed and magnetic conductive particles dispersed in the liquid rubber etc. are aligned in a chain reaction in a direction of the magnetic line of force. After this alignment, the upper and the lower metal molds are completely clamped to perform heating treatment, and the liquid rubber is cross-linked and cured. The conductive member 11 made of the cross-linked rubber-like elastic material containing the magnetic conductive material particles, integrally fixed in the opening 18C of the sheet-like connecting member 18 is obtained. After that, the electrical connection member is obtained by attaching the adhesive members 15 to this connecting member 18 using a known method.

The adhesive members 15 (the first adhesive member 15A and the second adhesive member 15B) include an adhesive layer composed of at least an adhesive. Each adhesive layer may be single adhesive layer, but may be e.g., a double-sided pressure-sensitive adhesive tape having a base material 16A and adhesive layers 16B and 16C provided on both surfaces of the base material 16A, as shown in FIG. 9(a). As just described, the double-sided pressure-sensitive adhesive tape having the base material 16A is used to adhere to the connecting member 18 through one adhesive layer 16B and to the other member through the other adhesive layer 16C.

A thickness of the base material 16A is e.g., 20 to 200 µm, preferably 40 to 175 µm, more preferably 60 to 150 µm. By setting the thickness of the base material 16A within the above range, the mechanical strength of the adhesive member 15 is obtained.

A thickness of each of the adhesive layers 16B and 16C is e.g., 10 to 100 µm, preferably 20 to 80 µm, more preferably 30 to 60 µm. By setting the thickness of each of the adhesive layers 16B and 16C within the above range, it is possible to deform each adhesive member in the thickness direction while ensuring the stickability.

Figure 9:
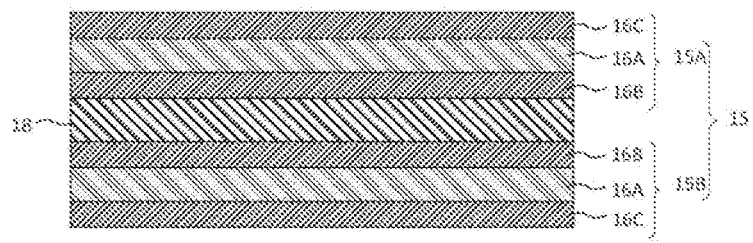
FIG. 9 is a sectional view showing one instance of adhesive members of an electrical connection member according to the first embodiment of the present invention.
Figure 9:
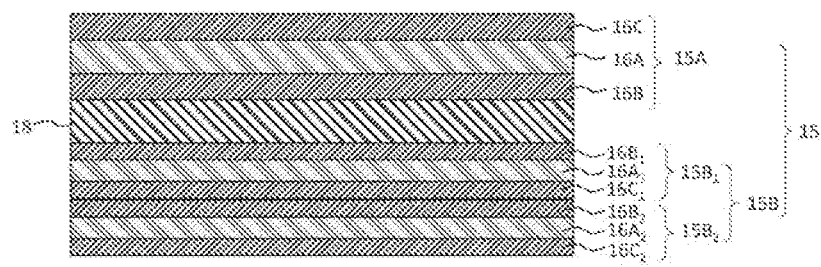
Figure 9:
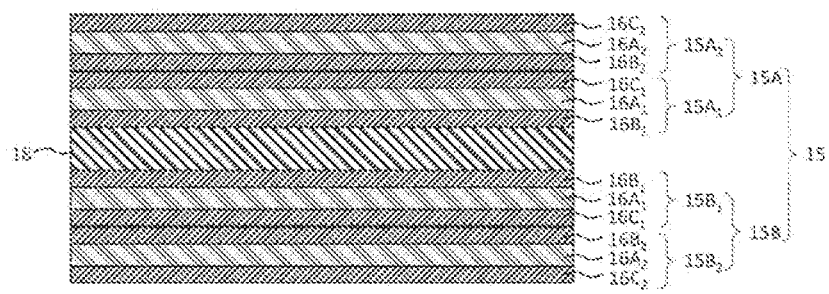

The adhesive members 15 (the first adhesive member 15A and the second adhesive member 15B) can be configured by stacking a plurality of double-sided pressure-sensitive adhesive tapes. As shown in FIG. 9(*b*), for example, the second adhesive member 15B on one side may be configured by stacking two adhesive members $15B_1$ and $15B_2$ which are the double-sided pressure-sensitive adhesive tapes. As shown in FIG. 9(*c*), further, like the second adhesive member 15B, the first adhesive member 15A may be also configured by stacking two adhesive members $15A_1$ and $15A_2$ which are the double-sided pressure-sensitive adhesive tapes, too.

A thickness of the base material 16A is e.g., 5 to 50 µm, preferably 10 to 45 µm, more preferably 15 to 40 µm. By setting the thickness of the base material 16A within the above range, flexibility of the adhesive member 15 can be improved.

A thickness of each adhesive layer of $16B_1$, $16B_2$, $16C_1$ and $16C_2$ is e.g., 5 to 60 µm, preferably 10 to 55 µm, more preferably 15 to 50 µm. By setting the thickness of each adhesive layer of $16B_1$, $16B_2$, $16C_1$ and $16C_2$ within the above range, it is possible to deform each adhesive member in the thickness direction while ensuring the stickability.

As described above, in a case that the adhesive members 15 are configured by stacking a plurality of the double-sided pressure-sensitive adhesive tapes, a thinner material may be adopted as the base materials $16A_1$ and $16A_2$ of the double-sided pressure-sensitive adhesive tapes to be used. As a result, the flexibility of the adhesive member 15 is improved, to be possible to adhere with a small pressure of e.g., about 100 to 300 N when adhering the adhesive member to the other member. The adhesive members 15 that are possible to adhere with a small pressure can reduce an area of air generated on the adhering surface when adhering, to be possible to secure sufficient adhering surface, resulting in obtaining high adhesive force.

Second Embodiment

Figure 3:
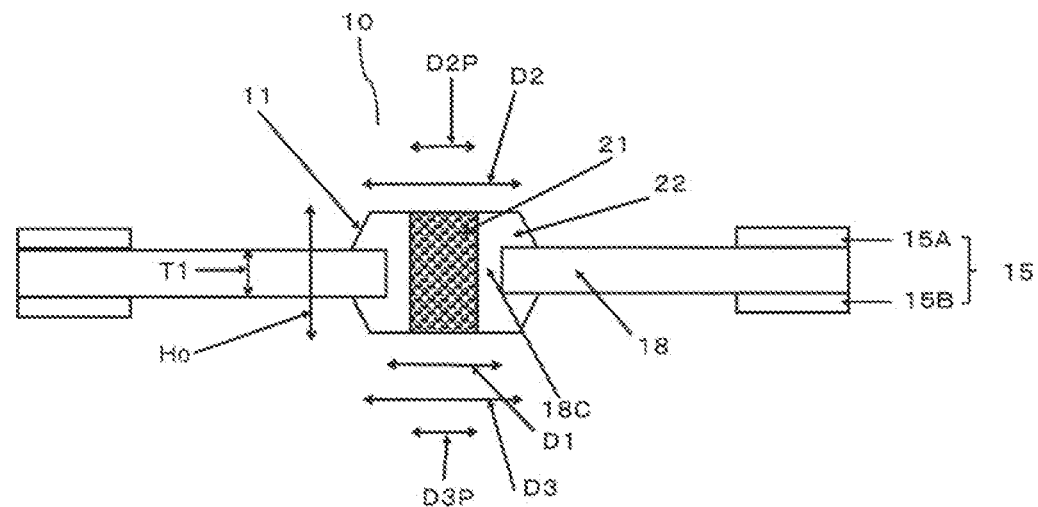
FIG. 3 is a sectional view showing one instance of a conductive member portion of an electrical connection member according to the second embodiment of the present invention.

FIG. 3 shows an electrical connection member 10 according to the second embodiment of the present invention. Hereinafter, with respect to the second embodiment, differences from the first embodiment are mainly described. Here, points not particularly referred to in the following description are the same as the first embodiment described above. As shown in FIG. 3, the electrical connection member 10 according to the second embodiment of the present invention also includes a conductive member 11 made of a rubber-like elastic material, adhesive members 15, and a sheet-like connecting member 18 connecting the conductive member 11 to the adhesive members 15.

Like the conductive member 11 used in the electrical connection member 10 according to the first embodiment, the conductive member 11 used in the electrical connection member 10 according to the second embodiment is also fixed in the opening 18C of the sheet-like connecting member 18.

In the electrical connection member 10 according to the second embodiment of the present invention, a compression set (a first compression set) of the conductive member 11 remained after the following treatment is 50% or less, wherein the treatment is applying a load between the upper surface and the lower surface of the conductive member 11, and after holding it at 105° C. for 22 hours in a state of 25% compression, removing the load applied, and holding it for 30 minutes at room temperature. The compression set is preferably 30% or less, more preferably 27% or less. Also, it is 7% or more practically.

In the second embodiment of the present invention, a compression set (a second compression set) of the conductive member 11, newly generated during the following treatment, is also preferably 50% or less, wherein the treatment includes holding the conductive member 11 at 105° C. for 22 hours in the state of 25% compression, releasing the compressive stress, and again holding it at 105° C. for 22 hours in the compressed state. The second compression set is more preferably 30% or less, even more preferably 27% or less. Also, it is 7% or more practically.

Further, electric resistance of the conductive member 11 at the 25% compression, and electric resistance measured after the following treatment are low as described above, wherein the treatment includes conducting 25% compressive deformation at 105° C. for 22 hours, putting it back to room temperature and again conducting 25% compressive deformation.

A difference between the electrical connection member 10 according to the first embodiment of the present invention and the electrical connection member 10 according to the second embodiment of the present invention is a structure of the conductive member 11 made of the rubber-like elastic material. On the other hand, the adhesive members 15 and the sheet-like connecting member 18 connecting the conductive member 11 to the adhesive members 15 are essentially the same.

In the electrical connection member 10 according to the second embodiment of the present invention, the conductive member 11 made of the rubber-like elastic material is composed of a columnar shape conductive portion 21 made of a conductive rubber-like elastic material and an insulating portion 22 made of an insulating rubber-like elastic material surrounding a circumference of the columnar shape conductive portion 21. In such case, the conductive rubber-like elastic material forming the columnar shape conductive portion contains conductive fillers of 25 to 80% by volume, preferably 30 to 75% by volume.

The columnar shape conductive portion 21 made of the conductive rubber-like elastic material exhibits conductivity by compressively deforming. An upper end face of the columnar shape conductive portion 21 reaches the upper surface of the conductive member 11, and a lower end face reaches the lower surface of the conductive member 11. When a load is applied between the upper surface and the lower surface of the conductive member 11, and the conductive member 11 made of the rubber-like elastic material is compressively deformed, the columnar shape conductive portion 21 is also compressively deformed, to become a conductive pass. The columnar shape conductive portion 21, at a state of compressive deformation, becomes the conductive pass connecting the upper surface to the lower surface of the conductive member 11 through the opening 18C of the sheet-like connecting member 18. In the electrical connection member 10 according to the second embodiment of the present invention, the conductible diameter $D_{effect}$ of the conductive member 11 is equivalent to a diameter D2P of the upper end face of the columnar shape conductive portion 21 exposed on the upper surface of the conductive member 11 or is equivalent to a diameter D3P of the lower end face of the columnar shape conductive portion 21 exposed on the lower surface of the conductive member 11.

Here, the diameter D2P of the upper end face and the diameter D3P of the lower end face of the columnar shape conductive portion 21 can be respectively calculated as a diameter of a circle having an area equal to an area of the upper end face and a diameter of circle having an area equal to an area of the lower end face. Further, in a case that the diameter D2P of the upper end face is different from the diameter D3P of the lower end face of the columnar shape conductive portion 21, the conductible diameter $D_{effect}$ of the conductive member 11 may be calculated as an average value (a geometric mean) of the diameter D2P of the upper end face and the diameter D3P of the lower end face of the columnar shape conductive portion 21.

The conductible diameter $D_{effect}$ of the conductive member 11 is, similar to that of the first embodiment, e.g., 1.0 mm or more and 6.0 mm or less, 1.2 mm or more and 5.0 mm or less, preferably 1.5 mm or more and 3.5 mm or less. The initial height $H_0$ of the conductive member 11 is preferably 0.50 mm or more, more preferably 0.60 mm or more, even more preferably 0.8 mm or more, also, preferably 7.50 mm or less, more preferably 5.0 mm or less, even more preferably 2.5 mm or less.

Similarly, it is desirable that a ratio (an aspect ratio) of the initial height $H_0$ to the conductible diameter $D_{effect}$ of the conductive member 11 is also selected from the following range: preferably 0.1 or more, more preferably 0.25 or more, even more preferably 0.5 or more, still more preferably 0.55 or more, also, preferably 1.5 or less, more preferably 1.45 or less, even more preferably 1.0 or less.

The diameter D2P of the upper end face and the diameter D3P of the lower end face of the columnar shape conductive portion 21 are respectively smaller than the diameter D2 of the upper surface and the diameter D3 of the lower surface of the conductive member 11. As a result, the insulating portion 22 made of an insulating rubber-like elastic material surrounding the circumference of the columnar shape conductive portion 21 constitutes outer edge portions of the upper surface and the lower surface of the conductive member 11.

In the second embodiment, the columnar shape conductive portion 21 penetrates through the opening 18C of the connecting member 18. In a state that the conductive member 11 is not compressively deformed, the diameters D2P and D3P of the columnar shape conductive portion 21 are smaller than the diameter D1 of the opening 18C of the connecting member 18.

Further, the conductible diameter $D_{effect}$ is preferably 35 to 97% with respect to the average value of the diameter D2 of the upper surface and the diameter D3 of the lower surface of the conductive member 11. By setting it to 35% or more, the electric resistance can be reduced sufficiently, and by setting it to 97% or less, a rate that the elastic deformation is converted to the plastic deformation is reduced, resulting in easily decreasing the first and second compression sets described above. From these perspectives, a ratio of the conductible diameter $D_{effect}$ to the average value of the diameters D2 and D3 is more preferably 50% or more, even more preferably 55% or more, still more preferably 60% or more, also, more preferably 95% or less. In the present embodiment, while a ratio of the conductible diameter $D_{effect}$ to the diameters D2 and D3 of the upper and lower surfaces is increased, the first and the second compression sets are reduced. Therefore, despite that large current can be carried, the rubber elasticity is maintained for a long period of time, thereby more stable conduction is possible.

The conductive member 11 bulges laterally outward along with the compressive deformation, but in the second embodiment of the present invention, with regard to its outward bulge deformation, the insulating portion 22 is mainly concerned. Since the insulating portion 22 made of the insulating rubber-like elastic material does not contain fillers that do not show elasticity, a rate that the elastic deformation is converted to the plastic deformation is significantly low while an elevated temperature state is maintained, compared with the conductive rubber-like elastic material containing the conductive fillers. Furthermore, as with the first embodiment, the outward bulge deformation of the conductive member 11 is limited by the presence of the sheet-like connecting member 18.

Therefore, in the electrical connection member 10 according to the second embodiment of the present invention, compared with the electrical connection member 10 according to the first embodiment of the present invention, reduction of the compression set is easy to be done.

The columnar shape conductive portion 21 contains the conductive fillers dispersed in the cross-linked rubber-like elastic material. When the conductive member 11 is loaded between the upper surface and the lower surface and compressively deformed, the electric resistance between the upper surface and the lower surface is reduced. The cross-linked rubber-like elastic material itself is an insulating cross-linked rubber-like elastic material, but when compressively deformed, the conductive fillers dispersed are coming into contact each other to make conductive passes, thereby reducing the electric resistance at the compression as described above.

With respect to the rubber-like elastic material and the conductive fillers used in the second embodiment, those are as described in the first embodiment. In the second embodiment, however, it is preferable that the conductive fillers having magnetism are used as the conductive fillers. And, it is preferable that the conductive fillers are aligned in a chain reaction in a direction of compressive stress (a height direction Z). By aligning the conductive fillers having magnetism contained to be continuous in the height direction Z, even if an amount of the compressive deformation due to the load applied between the upper surface and the lower surface is small, it is possible to make conductive passes.

A content ratio of the conductive fillers dispersed in the conductive rubber-like elastic material is selected from a range of 25 to 80% by volume, preferably a range of 30 to 75% by volume, more preferably a range of 40 to 70% by volume.

On the other hand, the insulating portion 22, normally, does not contain filler particles, and is formed of the insulating rubber-like elastic material. Thus, a content ratio of the conductive fillers in the insulating portion 22 is typically 0% by volume. In the insulating portion 22, however, within an extent that does not impair insulation, contained may be a small amount of the conductive fillers unavoidably mixed in the production process, etc. Therefore, for example, a content ratio of the conductive fillers in the insulating portion 22 may be less than 5% by volume, preferably less than 1% by volume.

Figure 4:
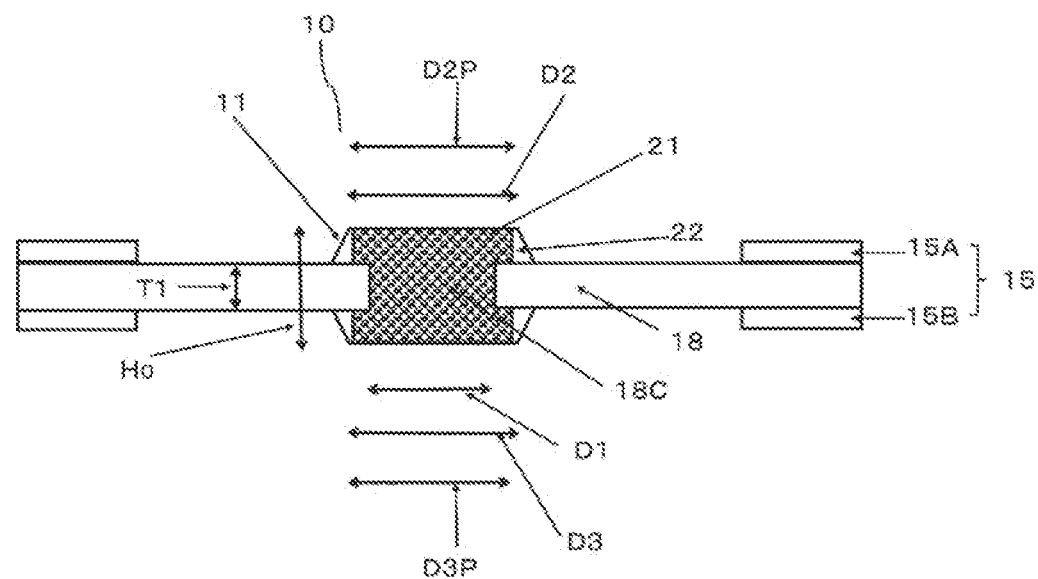
FIG. 4 is a sectional view showing another instance of the conductive member portion of the electrical connection member according to the second embodiment of the present invention.

Also, in the second embodiment of FIG. 3 described above, the diameter D2P of the upper end face and the diameter D3P of the lower end face of the columnar shape conductive portion 21 made of the conductive rubber-like elastic material are smaller than the diameter D1 of the opening 18C of the connecting member 18. However, as long as the first compression set described above can be 50% or less, as shown in FIG. 4, the diameter D2P of the upper end face and the diameter D3P of the lower end face of the columnar shape conductive portion 21 made of the conductive rubber-like elastic material may be larger than the diameter D1 of the opening 18C of the connecting member 18.

<Production Method>

Hereinafter, a production method of an electrical connection member 10 of the second embodiment of the present invention will be described. First of all, in the present production method, a metal mold is prepared. The metal mold is composed of an upper mold and a lower mold made of a non-magnetic material such as aluminum and copper. In the upper mold and the lower mold, pins made of ferromagnetic material such as iron and a magnet are implanted into positions corresponding to the conductive member 11, respectively. One end of each pin becomes exposed on each cavity surface of the upper mold and the lower mold.

Further, a resin sheet etc. for constituting the connecting member 18 is provided. A resin sheet may be prepared by punching etc. to form through-holes for a plurality of openings 18C. The resin sheet is inserted in the metal mold in which the pins are implanted, and liquid rubber to be a raw material of the rubber-like elastic material is injected in a cavity. In the liquid rubber to be a raw material of the conductive rubber-like elastic material, the conductive particles having magnetism are mixed in advance.

Next, an external magnetic field is applied from above and below the metal mold using a magnet. In the cavity, a parallel magnetic field that connects one pin to the other pin is formed and conductive particles having magnetism in the liquid rubber etc. are aligned in a chain reaction in a direction of the magnetic line of force. After this alignment, the upper and the lower metal molds are completely clamped to perform heating treatment, and the liquid rubber is cross-linked and cured, thereby obtaining the sheet-like formed product in which the conductive members 11 are integrally fixed in the connecting member 18 made of the resin sheet. After that, the adhesive members are attached to the sheet-like formed product by a known method, obtaining the electrical connection member 10.

In the embodiment described above, the electrical connection member is described in reference with specific examples having the adhesive members and the connecting member, but if the first compression set and the electric resistance of the conductive member is the above predetermined value or less, the adhesive members and the connecting member may be omitted. For example, in the second embodiment, by providing the insulating portion 22, the conductive member 11 becomes difficult to deform plastically, the first compression set can be reduced even if the connecting member is not provided.

[Glass Plate Structure with Terminal]

Figure 10:
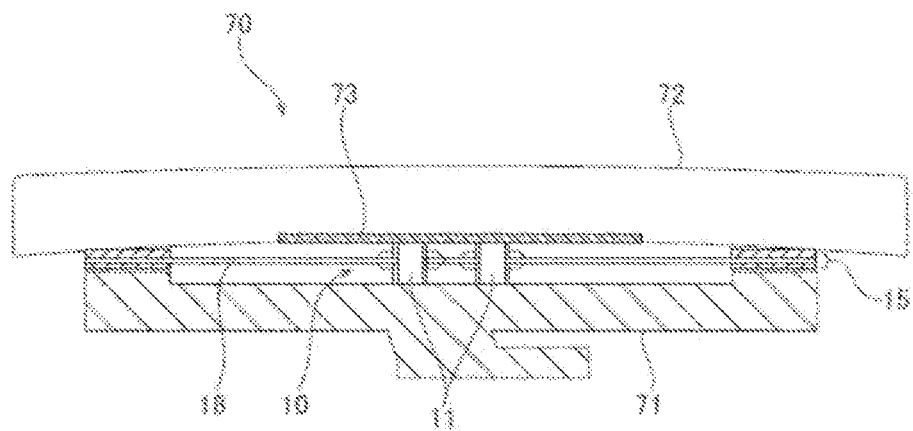
FIG. 10 is a sectional view showing a glass plate structure with a terminal.

The electrical connection member 10 of the present invention is used for e.g., electrically connecting a terminal to a conductive layer, and fixing the terminal to a glass plate having the conductive layer. FIG. 10 shows a glass plate structure with a terminal 70, in which the terminal 71 is fixed to the glass plate 72, by using the electrical connection member 10 according to the second embodiment. Hereinafter, the glass plate structure with the terminal 70 will be described in more detail.

The glass plate structure with the terminal 70 includes the electrical connection member 10, the glass plate 72, and the terminal 71. The glass 72 is provided with the conductive layer 73 on one side surface. The terminal 71 is mounted to the surface provided with the conductive layer 73 of the glass plate 72.

The material of the conductive layer 73 is not particularly limited, but may be a metal film having conductivity such as gold, silver, platinum, aluminum, copper, iron, palladium, chromium, and stainless steel, or such a metal containing coating film. Further a material of the terminal 71 is also not particularly limited, but may be similarly a metal having conductivity such as gold, silver, platinum, aluminum, copper, iron, palladium, chromium, and stainless steel.

In the glass plate structure with the terminal 70, the electrical connection member 10 is placed between the terminal 71 and the conductive layer 73. Here, the upper surface and the lower surface of the conductive member 11 of the electrical connection member 10 come into contact with the conductive layer 73 and the terminal 71, respectively. Therefore, the terminal 71 is connected to the conductive layer 73 through the conductive portion 21 of the conductive member 11.

Also, the electrical connection member 10 makes the terminal 71 fixed on the glass plate 72, by adhering the second adhesive member 15B of the adhesive members 15 to the terminal 71 and adhering the first adhesive member 15A to the glass plate 72. Further, the first adhesive member 15A, in some case, may be adhered to the conductive layer 73 provided on the glass plate 72.

Here, the conductive portion 21 of the conductive member 11 may come into contact with the terminal 71 and the conductive layer 73 in a state of compressive deformation. The conductive portion 21 of the conductive member 11 is made of the conductive rubber-like elastic material of which the conductivity is increased at the state of compressive deformation, and is additionally pressed against the terminal 71 and the conductive layer 73 due to the repulsive force associated with the compressive deformation. Therefore, it is possible to securely make an electrical connection between the terminal 71 and the conductive layer 73 through the conductive portion 21 of the conductive member 11. Also, when additionally pressed due to the repulsive force with the compressive deformation, the terminal 71 becomes easy to peel from the glass plate 72, but in the glass plate structure with the terminal 70, the terminal 71 is securely fixed on the glass plate 72 by means of the adhesive members 15, and thus it becomes difficult to occur peeling.

Here, the conductive portion 21 of the conductive member 11 may be in a state of compression of, e.g., 5 to 40%, preferably 10 to 30%.

Also, in a case that the electrical connection member 10 includes a plurality of conductive members 11, a surface of which the terminal 71 is in contact with the lower surfaces of a plurality of conductive members 11 may be planar. By being a planar surface, a load is evenly applied to a plurality of conductive members 11, becoming easier to make them compress at the same compressive strain.

Besides, in the structure of FIG. 10, even at a time of compressive deformation, a height from the lower surface of the connecting member 18 to the lower surface of the conductive member 11 becomes larger than a thickness of the second adhesive member 15B. Therefore, in the terminal 71, an outer peripheral portion 71A to be adhered to the second adhesive member 15B becomes higher than that of other portions, but the outer peripheral portion 71A does not necessarily have to be higher, and thus an entire surface opposing the glass plate 72 of the terminal 71 may be planar.

The glass plate 72 is not particularly limited, but is preferably a glass plate for an automobile. For the automotive glass plate, heating wires may be provided for a defroster, a defogger, etc. On the glass plate 72 provided with the heating wires, normally, provided is a conductive layer 73 to which the heating wires are bundled and connected. To the conductive layer 73, the terminal 71 is connected through the conductive member 11, so that current is passed to the heating wires through the terminal 71, the conductive member 11, and the conductive layer 73.

The heating wires provided on the automotive glass consume large power and need to pass large current, but the electrical connection sheet 10 of the present invention has small electric resistance as described above, thereby being possible to suppress a temperature increase even if large current flows for the heating wires.

Therefore, it is preferable that the electrical connection member of the present invention is used for the automotive glass plate, particularly for a glass plate of a rear window often provided with the heating wires for the defogger. In addition, on the automotive glass plate, installed may be an antenna, a camera, a camera heater, a wiper heater, a back light, a rain sensor, and other sensors, and for electrical connection to those, the electrical connection member and the glass plate structure with the terminal of the present invention can be utilized.

In the above description of the glass plate structure with the terminal, described is an example in which the electrical connection member according to the second embodiment is used, but also similar are cases that the electrical connection members according to other embodiments are used, thus such description is omitted.

EXAMPLES

Hereinafter, the present invention will be described in more detail with reference to Examples. However, the present invention is not intended to be limited to these examples.

Example 1

As shown below, prepared was a conductive member made of a cross-linked rubber-like elastic material containing magnetic conductive particles, integrally fixed in an opening of a sheet-like connecting member. A compression set measured after applying a load between an upper surface and a lower surface of the conductive members, and conducting 25% compressive deformation at 105° C. for 22 hours, was evaluated.

First, prepared was a metal mold in which pins made of a ferromagnetic material were implanted. In the metal mold, silicone rubber as liquid rubber, in which silver-coated nickel particles (an average particle diameter of 35 μm) as conductive fillers having magnetism were mixed, was poured and subjected to vulcanization molding. In molding of the conductive members, the sheet-like connecting member which was a PET sheet having a through-hole and a thickness of 0.1 mm, was inserted in the metal mold, and the conductive members were molded integrally with the openings of the sheet-like connecting member. The conductive members had a structure as shown in FIG. 3 that the sheet-like connecting member was embedded in the insulating portion. A content ratio of the conductive fillers in the conductive rubber-like elastic material of the conductive portion formed was about 30% by volume. The conductive fillers were continuously connected in a height direction. A hardness after the liquid silicone rubber not mixing the conductive fillers was subjected to vulcanization molding (cured) was A35. Therefore, a hardness of the insulating rubber-like elastic material constituting the insulating portion was A35.

The sheet-like connecting member integrally molded with the conductive members may be an electrical connection member in which double sided pressure-sensitive adhesive tapes are regard as adhesive members, by adhering the double-sided pressure-sensitive adhesive tapes having a frame-shape surrounding a peripheral of the conductive members, on each of the upper and lower surfaces of the sheet-like connecting member. Here, the double-sided pressure-sensitive adhesive tape had a base material and adhesive layers provided on both sides of the base material. A thickness of the double-sided pressure-sensitive adhesive tapes adhered on the upper surface 18A and the lower surface 18B of the sheet-like connecting member was 0.2 mm.

In Example 1, two openings were provided in the sheet-like connecting member, and two conductive members were formed in the sheet-like connecting member. A diameter D1 of the opening provided in the sheet-like connecting member was 2.0 mm.

Further, with respect to the conductive member, a height $H_0$ of the conductive member before compressive deformation was 0.65 mm, a diameter (D2P, D3P) of a columnar shape conductive portion 21 was 1.2 mm, and a diameter (D2, D3) of an insulating portion 22 surrounding the columnar shape conductive portion 21 was 2.4 mm. Therefore, a ratio of a conductible diameter $D_{effect}$ (an average value of D2P and D3P) to an average value of the diameter D2 and the diameter D3 was 50%. The diameter D1 of the opening was 167% to the conductible diameter $D_{effect}$. A ratio of the height $H_0$ of the conductive member over the conductible diameter $D_{effect}$ (an aspect ratio) was 0.65/1.2 (=0.54). When a load was applied between the upper surfaces and the lower surfaces of the conductive members prepared, and the conductive members were compressively deformed, electric resistance at 25% compression was 8.0 mΩ.

A compression set (a first compression set) measured after 25% compressive deformation at 105° C. for 22 hours conducted by maintaining a height H1 of the conductive members at the compression utilizing a spacer was evaluated, and was 10%.

After the first compressive deformation treatment and after evaluating the compression set, the compressive deformation treatment was conducted again, and a compression set (a second compression set) measured after the 25% compressive deformation at 105° C. for 22 hours was evaluated, and was 12%. Also, when the compressive deformation was conducted again, the electric resistance at the 25% compression was 2.2 mΩ.

Example 2

Example 2 was conducted in the same manner as in Example 1 except that the following points were different.

In Example 2, with respect to a conductive member, a height $H_0$ of the conductive member before compressive deformation was 0.64 mm, a diameter (D2P, D3P) of a columnar shape conductive portion 21 was 1.8 mm, and a diameter (D2, D3) of an insulating portion 22 surrounding the columnar shape conductive portion 21 was 2.6 mm. Therefore, a ratio of a conductible diameter $D_{effect}$ (an average value of D2P and D3P) to an average value of the diameter D2 and the diameter D3 was 69%. A ratio of the height $H_0$ of the conductive member over the conductible diameter $D_{effect}$ (an aspect ratio) was 0.64/10.8 (=0.36). Also, a diameter D1 of an opening 18C of a sheet-like connecting member was 2.0 mm. The diameter D1 of the opening was 111% to the conductible diameter $D_{effect}$. When a load was applied between the upper surfaces and the lower surfaces of the conductive members prepared, and the conductive members were compressively deformed, electric resistance at 25% compression was 6.5 mΩ.

A compression set (a first compression set) measured after 25% compressive deformation at 105° C. for 22 hours conducted by maintaining a height H1 of the conductive members at the compression utilizing a spacer was evaluated, and was 14%.

After evaluating the first compression set, the compressive deformation treatment was conducted again, and a compression set (a second compression set) measured after 25% the compressive deformation at 105° C. for 22 hours was evaluated, and was 14%. Also, when the compressive deformation was conducted again, the electric resistance at the 25% compression was 1.5 mΩ.

Example 3

Example 3 was conducted in the same manner as in Example 1 except that the following points were different.

In Example 3, with respect to a conductive member, a height $H_0$ of the conductive member before compressive deformation was 0.70 mm, a diameter (D2P, D3P) of a columnar shape conductive portion 21 was 2.2 mm, and a diameter (D2, D3) of an insulating portion 22 surrounding the columnar shape conductive portion 21 was 2.5 mm. Therefore, a ratio of a conductible diameter $D_{effect}$ (an average value of D2P and D3P) to an average value of the diameter D2 and the diameter D3 was 88%. A ratio of the height $H_0$ of the conductive member over the conductible diameter $D_{effect}$ (an aspect ratio) was 0.70/2.2 (=0.32). Also, a diameter D1 of an opening 18C of a sheet-like connecting member was 2.0 mm. The diameter D1 of the opening was 91% to the conductible diameter $D_{effect}$. When a load was applied between upper surfaces and lower surfaces of the conductive members prepared, and the conductive members were compressively deformed, electric resistance at 25% compression was 5.5 mΩ.

A compression set (a first compression set) measured after 25% compressive deformation at 105° C. for 22 hours conducted by maintaining a height H1 of the conductive members at the compression utilizing a spacer was evaluated, and was 18%.

After evaluating the first compression set, the compressive deformation treatment was conducted again, and a compression set (a second compression set) measured after the 25% compressive deformation at 105° C. for 22 hours was evaluated, and was 19%. Also, when the compressive deformation was conducted again, the electric resistance at the 25% compression was 1.1 mΩ.

Example 4

Example 4 was conducted in the same manner as in Example 1 except that the following points were different.

In Example 4, with respect to a conductive member, a height $H_0$ of the conductive member before compressive deformation was 0.75 mm, a diameter (D2P, D3P) of a columnar shape conductive portion 21 was 2.3 mm, and a diameter (D2, D3) of an insulating portion 22 surrounding the columnar shape conductive portion 21 was 2.4 mm. Therefore, a ratio of a conductible diameter $D_{effect}$ (an average value of D2P and D3P) to an average value of the diameter D2 and the diameter D3 was 96%. A ratio of the height $H_0$ of the conductive member over the conductible diameter $D_{effect}$ (an aspect ratio) was 0.75/2.3 (=0.33). Also, a diameter D1 of an opening 18C of a sheet-like connecting member was 2.0 mm. The diameter D1 of the opening was 87% to the conductible diameter $D_{effect}$. When a load was applied between upper surfaces and lower surfaces of the conductive members prepared, and the conductive members were compressively deformed, electric resistance at 25% compression was 5.0 mΩ.

A compression set (a first compression set) measured after 25% compressive deformation at 105° C. for 22 hours conducted by maintaining a height H1 of the conductive members at the compression utilizing a spacer was evaluated, and was 19%.

After evaluating the first compression set, the compressive deformation treatment was conducted again, and a compression set (a second compression set) measured after the 25% compressive deformation at 105° C. for 22 hours was evaluated, and was 25%. Also, when the compressive deformation was conducted again, the electric resistance at the 25% compression was 1.0 mΩ.

Example 5

In Example 5, a sheet-like connecting member was provided with four openings, and four conductive members were formed in a sheet-like connecting member. In Example 5, the whole connecting members were prepared by using a cross-linked rubber-like elastic material which a liquid silicone rubber containing conductive fillers (silver coated glass fiber powder) was subjected to cross-linking and curing. A content ratio of the conductive fillers in the conductive rubber-like elastic material formed was about 50% by volume. A hardness after the liquid silicone rubber not mixing the conductive fillers was subject to vulcanization molding (cured) was A30.

With respect to the conductive member prepared in Example 5, a height $H_0$ of the conductive member before compressive deformation was 0.69 mm, and a diameter (D2, D3) of an upper surface and a lower surface of the conductive member was 2.4 mm. A ratio of the height $H_0$ of the conductive member over the diameter (the conduction diameter) D2 of the conductive member (an aspect ratio) was 0.69/2.4 (=0.29). A PET sheet having a thickness of 0.1 mm was used for the sheet-like connecting member. A diameter of a through-hole provided in a sheet-like connecting member was 2.0 mm. The diameter of the opening 18C provided in the sheet-like connecting member was 83% to the diameter D2 of the upper surface of the conductive member (the conductible diameter of the conductive member). When a load was applied between upper surfaces and lower surfaces of the conductive members prepared, and the conductive members were compressively deformed, electric resistance at 25% compression was 50 mΩ.

A compression set (a first compression set) measured after 25% compressive deformation at 105° C. for 22 hours conducted by maintaining a height H1 of the conductive members at the compression utilizing a spacer was evaluated, and was 24%.

After evaluating the first compression set, the compressive deformation treatment was conducted again, and a compression set (a second compression set) measured after the 25% compressive deformation at 105° C. for 22 hours was evaluated, and was 26%. Also, when the compressive deformation was conducted again, the electric resistance at the 25% compression was 40 mΩ.

Example 6

Example 6 was conducted in the same manner as in Example 1 except that the following points were different.

In Example 6, with respect to a conductive member, a height $H_0$ of the conductive member before compressive deformation was 0.71 mm, a diameter (D2P, D3 of a columnar shape conductive portion 21 was 2.0 mm, and a diameter (D2, D3) of an insulating portion 22 surrounding the columnar shape conductive portion 21 was 2.4 mm. Therefore, a ratio of a conductible diameter $D_{effect}$ (an average value of D2P and D3 to an average value of the diameter D2 and the diameter D3 was 83%. A ratio of the height $H_0$ of the conductive member over the conductible diameter $D_{effect}$ (aspect ratio) was 0.71/2.0 (=0.36). Also, a diameter D1 of an opening 18C of a sheet-like connecting member was 2.0 mm, and 100% of the diameters (D2P, D3 (the conductible diameter $D_{effect}$) of the columnar shape conductive portion 21. When a load was applied between upper surfaces and lower surfaces of the conductive members prepared, and the conductive members were compressively deformed, electric resistance at 25% compression was 4.5 mΩ.

A compression set (a first compression set) measured after 25% compressive deformation at 105° C. for 22 hours conducted by maintaining a height H1 of the conductive members at the compression utilizing a spacer was evaluated, and was 30%.

After the first compressive deformation treatment, and after evaluating the compression set, the compressive deformation treatment was conducted again, and a compression set (a second compression set) measured after the 25% compressive deformation at 105° C. for 22 hours was evaluated, and was 31%. Also, when the compressive deformation was conducted again, the electric resistance at the 25% compression was 0.9 mΩ.

In the conductive members prepared in Example 6, when the height 0.65 mm of the conductive members after the evaluation of the first compression set decreased to the height 0.62 mm of the conductive members after the evaluation of the second compression set, the electric resistance at the 25% compression was significantly reduced from 4.5 mΩ to 0.9 mΩ.

Example 7

Example 7 differs from Example 6 in the following points.

With respect to a conductive member prepared in Example 7, a height $H_0$ of the conductive member before compressive deformation was 0.75 mm, a conduction diameter DC (a diameter D2P of an upper end face of a columnar shape conductive portion) of a columnar shape conductive portion 21 was 2.0 mm, and an insulating diameter D1 (a diameter D2 of an upper surface of the conductive member) of an insulating portion 22 surrounding the columnar shape conductive portion 21 was 2.4 mm. Therefore, a ratio of the conduction diameter over the insulating diameter was corresponding to 83%. A ratio of the height $H_0$ of the conductive member over the conduction diameter DC (an aspect ratio) was 0.75/2.0 (=0.38). Different from the conductive member prepared in Example 6, the sheet-like connecting member was not inserted in the side surface portion, and the conductive member was not connected to a sheet-like connecting member, and not fixed in an opening of the connecting member.

When a load was applied between the upper surfaces and the lower surfaces of the conductive members prepared, and the conductive members were compressively deformed, electric resistance at 25% compression was 5.5 ma Therefore, the electric resistance at the 25% compression was 20 mΩ or less.

A compression set (a first compression set) measured after 25% compressive deformation at 105° C. for 22 hours conducted by maintaining a height H1 of the conductive members at the compression utilizing a spacer was evaluated, and was 29%.

After the first compressive deformation treatment, and after evaluating the compression set, the compressive deformation treatment was conducted again, and a compression set (a second compression set) measured after the 25% compressive deformation at 105° C. for 22 hours was evaluated, and was 55%. Also, when the compressive deformation was conducted again, the electric resistance at 25% compression was 15 mΩ.

In the conductive member prepared in Example 7, when the height 0.68 mm of the conductive members after the evaluation of the first compression set decreased to the height 0.61 mm of the conductive members after the evaluation of the second compression set, the electric resistance at the 25% compression was increased from 5.5 mΩ to 15.0 mΩ.

Example 8

Example 8 was conducted in the same manner as in Example 1 except that the following points were different.

In Example 8, with respect to a conductive member, a height $H_0$ of the conductive member before compressive deformation was 1.50 mm, a diameter (D2P, D3 of a columnar shape conductive portion 21 was 1.0 mm, and a diameter (D2, D3) of an insulating portion 22 surrounding the columnar shape conductive portion 21 was 2.6 mm. Therefore, a ratio of a conductible diameter $D_{effect}$ (an average value of D2P and D3 to an average value of the diameter D2 and the diameter D3 was 38%. A ratio of the height $H_0$ of the conductive member over the conductible diameter $D_{effect}$ (an aspect ratio) was 1.50/1.0 (=1.5). Also, a diameter D1 of an opening 18C of a sheet-like connecting member was 2.0 mm. The diameter D1 of the opening was 200% to the conductible diameter $D_{effect}$. A content ratio of the conductive fillers in the conductive rubber-like elastic material of the conductive portion formed was 30% by volume. When a load was applied between upper surfaces and lower surfaces of the conductive members prepared, and the conductive members were compressively deformed, electric resistance at 25% compression was 60 mΩ.

A compression set (a first compression set) measured after 25% compressive deformation at 105° C. for 22 hours conducted by maintaining a height H1 of the conductive members at the compression utilizing a spacer was evaluated, and was 12%.

After evaluating the first compression set, the compressive deformation treatment was conducted again, and a compression set (a second compression set) measured after the 25% compressive deformation at 105° C. for 22 hours was evaluated, and was 12%. Also, when the compressive deformation was conducted again, the electric resistance at the 25% compression was 40 mΩ.

Example 9

Example 9 was conducted in the same manner as in Example 1 except that the following points were different.

In Example 9, with respect to a conductive member, a height $H_0$ of the conductive member before compressive deformation was 0.75 mm, a diameter (D2P, D3P) of a columnar shape conductive portion 21 was 4.5 mm, and a diameter (D2, D3) of an insulating portion 22 surrounding the columnar shape conductive portion 21 was 5.0 mm. Therefore, a ratio of a conductible diameter $D_{effect}$ (an average value of D2P and D3P) to an average value of the diameter D2 and the diameter D3 was 90%. A ratio of the height $H_0$ of the conductive member over the conductible diameter $D_{effect}$ (an aspect ratio) was 0.75/4.5 (=0.17). Also, a diameter D1 of an opening 18C of a sheet-like connecting member was 2.5 mm. The diameter D1 of the opening was 56% to the conductible diameter $D_{effect}$. A content ratio of the conductive fillers in the conductive rubber-like elastic material of the conductive portion formed was 30% by volume. When a load was applied between the upper surfaces and lower surfaces of conductive members prepared, and the conductive members were compressively deformed, electric resistance at 25% compression was 5.0 mΩ.

A compression set (a first compression set) measured after 25% compressive deformation at 105° C. for 22 hours conducted by maintaining a height H1 of the conductive members at the compression utilizing a spacer was evaluated, and was 35%.

After evaluating the first compression set, the compressive deformation treatment was conducted again, and a compression set (a second compression set) measured after the 25% compressive deformation at 105° C. for 22 hours was evaluated, and was 35%. Also, when the compressive deformation was conducted again, the electric resistance at the 25% compression was 1.1 mΩ.

Example 10

Example 10 was conducted in the same manner as in Example 1 except that the following points were different.

In Example 10, with respect to a conductive member, a height $H_0$ of the conductive member before compressive deformation was 0.75 mm, a diameter (D2P, D3P) a columnar shape conductive portion 21 was 4.8 mm, and a diameter (D2, D3) of an insulating portion 22 surrounding the columnar shape conductive portion 21 was 5.0 mm. Therefore, a ratio of a conductible diameter $D_{effect}$ (an average value of D2P and D3P) to an average value of the diameter D2 and the diameter D3 was 96%. A ratio of the height $H_0$ of the conductive member over the conductible diameter $D_{effect}$ (an aspect ratio) was 0.75/4.8 (=0.16). Also, a diameter D1 of an opening 18C of a sheet-like connecting member was 2.5 mm. The diameter D1 of the opening was 52% to the conductible diameter $D_{effect}$. A content ratio of the conductive fillers in the conductive rubber-like elastic material of the conductive portion formed was 50% by volume. When a load was applied between upper surfaces and lower surfaces of the conductive members prepared, and the conductive members were compressively deformed, electric resistance at 25% compression was 3.0 mΩ.

A compression set (a first compression set) measured after 25% compressive deformation at 105° C. for 22 hours conducted by maintaining a height H1 of the conductive members at the compression utilizing a spacer was evaluated, and was 40%.

After evaluating the first compression set, the compressive deformation treatment was conducted again, and a compression set (a second compression set) measured after the 25% compressive deformation at 105° C. for 22 hours was evaluated, and was 40%. Also, when the compressive deformation was conducted again, the electric resistance at the 25% compression was 0.9 mΩ.

Comparative Example 1

Comparative Example 1 was conducted in the same manner as in Example 1 except that the following points were different.

In Comparative Example 1, with respect to a conductive member, a height $H_0$ of the conductive member before compressive deformation was 1.00 mm, a diameter (D2P, D3P) of a columnar shape conductive portion 21 was 0.5 mm, and a diameter (D2, D3) of an insulating portion 22 surrounding the columnar shape conductive portion 21 was 2.6 mm. Therefore, a ratio of a conductible diameter $D_{effect}$ (an average value of D2P and D3P) to an average value of the diameter D2 and the diameter D3 was 19%. A ratio of the height $H_0$ of the conductive member over the conductible diameter $D_{effect}$ (an aspect ratio) was 1.00/0.5 (=2.00). Also, a diameter D1 of an opening 18C of a sheet-like connecting member was 2.0 mm. The diameter D1 of the opening was 400% to the conductible diameter $D_{effect}$. A content ratio of the conductive fillers in the conductive rubber-like elastic material of the conductive portion formed was 20% by volume. When a load was applied between upper surfaces and lower surfaces of the conductive members prepared, and the conductive members were compressively deformed, electric resistance at 25% compression was 200 mΩ. In Comparative Example 1, the ratio of the height $H_0$ of the conductive member over the conductible diameter $D_{effect}$ (aspect ratio) was more than 1.5, and the diameter (D2P, d3P) of the columnar shape conductive portion 21 had not reached 1.2 mm. Further, the content ratio of the conductive fillers had not reached 25% by volume, and dispersion was sparse. As a result, the electric resistance at the 25% compression was more than 0.1Ω.

A compression set (a first compression set) measured after 25% compressive deformation at 105° C. for 22 hours conducted by maintaining a height H1 of the conductive members at the compression utilizing a spacer was evaluated, and was 10%.

After evaluating the first compression set, the compressive deformation treatment was conducted again, and a compression set (a second compression set) measured after the 25% compressive deformation at 105° C. for 22 hours was evaluated, and was 10%. Also, when the compressive deformation was conducted again, the electric resistance at the 25% compression was 450 mΩ.

Comparative Example 2

Comparative Example 2 was conducted in the same manner as in Example 1 except that the following points were different.

In Comparative Example 2, with respect to a conductive member, a height $H_0$ of the conductive member before compressive deformation was 0.66 mm, a diameter (D2P, D3P) a columnar shape conductive portion 21 was 7.0 mm, and a diameter (D2, D3) of an insulating portion 22 surrounding the columnar shape conductive portion 21 was 7.0 mm. Therefore, a ratio of a conductible diameter $D_{effect}$ (an average value of D2P and D3P) to an average value of the diameter D2 and the diameter D3 was 100%. Thus, the insulating portion 22 was not exposed on an upper surface and a lower surface of the conductive member, but existed only on a side surface of the conductive member. A ratio of the height $H_0$ of the conductive member over the conductible diameter $D_{effect}$ (an aspect ratio) was 0.66/7.0 (=0.09). Also, a diameter D1 of an opening 18C of a sheet-like connecting member was 15.0 mm. The diameter D1 of the opening was 214% to the conductible diameter $D_{effect}$ (the conductible diameter $D_{effect}$ was 47% to the diameter D1 of the opening). A content ratio of the conductive fillers in the conductive rubber-like elastic material of the conductive portion formed was 50% by volume. When a load was applied between the upper surfaces and the lower surfaces of the conductive members prepared, and the conductive members were compressively deformed, electric resistance at 25% compression was 3.0 mΩ.

A compression set (a first compression set) measured after 25% compressive deformation at 105° C. for 22 hours conducted by maintaining a height H1 of the conductive members at the compression utilizing a spacer was evaluated, and was 55%.

After evaluating the first compression set, the compressive deformation treatment was conducted again, and a compression set (a second compression set) measured after the 25% compressive deformation at 105° C. for 22 hours was evaluated, and was 55%. Also, when the compressive deformation was conducted again, the electric resistance at the 25% compression was 10 mΩ.

In Comparative Example 2, the conductible diameter $D_{effect}$ did not reach 50% of the diameter D1 of the opening, and the ratio (the aspect ratio) of the height $H_0$ of the conductive member over the conductible diameter $D_{effect}$ did not reach 0.1. As a result, the first compression set at the 25% compression was 55%, and further, the second compression set also reached 55%, and thus, in the height of the conductive members after the test, there occurred reduction of the height more than 25% in total based on the height $H_0$ of the conductive members before the compressive deformation. At the end of the evaluation test of the second compression set, a reduction of the height of the conductive member was large, after then, it was difficult to maintain electrical contacts on the upper surfaces and the lower surfaces on which was 25% compressed and loaded.

Comparative Example 3

The electrical connection member prepared in Comparative Example 3 was a sponge gasket having a structure in which an aluminum deposited PET film was rolled on a polyurethane foam. This sponge gasket did not include an adhesive member and a connecting member. Five sponge gaskets in total were prepared. An initial thickness of the five sponge gaskets prepared was 1.12 mm in average.

Utilizing a spacer having a thickness of 0.84 mm, tried was an evaluation of a compression set measured after compressive deformation at 105° C. for 22 hours conducted by maintaining a height of the electrical connection member at the compression to 0.84 mm.

After compressively deformed, and after holding it at 105° C. for 22 hours, thicknesses of the sponge gaskets were in a range of 0.07 to 0.18 mm, less than the thickness of the spacer. As a result, the compression set calculated was more than 100%, and an average value of the compression set of the evaluated five sponge gaskets was 353%.

In the electrical connection member prepared in Comparative Example 3, the polyurethane foam was used, but after being compressively deformed, during holding it at 105° C. for 22 hours, the polyurethane foam lost elasticity, and then did not show restorability even if the load was removed.

REFERENCE SIGNS LIST

10 Electrical connection member
11 Conductive member
15 Adhesive member (first adhesive member 15A and second adhesive member 15B)
15A First adhesive member
15B Second adhesive member
16 Cutout
17 Middle position of side surface height of conductive member
18 Connecting member
18A Upper surface of connecting member
18B Lower surface of connecting member
18C Opening of connecting member
19 Through-hole having small diameter
21 Columnar shape conductive portion
22 Insulating portion
70 Glass plate structure with terminal
71 Terminal
72 Glass plate
73 Conductive layer
D2P Diameter of upper surface of conductive portion
D2 Diameter of upper surface of conductive member
H Height of conductive member
DC Conduction diameter
D1 Insulating diameter

The invention claimed is:

1. An electrical connection member comprising a conductive member made of a rubber-like elastic material,
   the conductive member having at least an upper surface and a lower surface;
wherein
the electrical connection member comprises an adhesive member and a connecting member connecting the conductive member to the adhesive member; wherein
the connecting member comprises an opening to fix the conductive member; and
wherein
the conductive member is fixed to the connecting member by bringing a side surface of the conductive member into contact with the opening of the connecting member;
   wherein a compression set measured after the following treatment is 50% or less, the treatment being applying a load between the upper surface and the lower surface of the conductive member, and conducting 25% compressive deformation at 105° C. for 22 hours; and
   electric resistance between the upper surface and the lower surface is 0.1 Ω or less during application of the load, wherein the electrical connection member comprises an adhesive member and a connecting member connecting the conductive member to the adhesive member; wherein the connecting member comprises an opening to fix the conductive member; and wherein the conductive member is fixed to the connecting member by bringing a side surface of the conductive member into contact with the opening of the connecting member.

2. The electrical connection member according to claim 1, wherein a diameter of the opening of the connecting member is selected from a range of 50% to 200% of a conductible diameter of the conductive member.

3. The electrical connection member according to claim 1, wherein an upper surface and a lower surface of the conductive member fixed in the opening of the connecting member protrude from an upper surface and a lower surface of the connecting member, respectively.

4. The electrical connection member according to claim 1, wherein with respect to a height direction of the side surface of the conductive member, a portion brought into contact with the opening of the connecting member includes a middle position of a height of the side surface.

5. The electrical connection member according to claim 1, wherein
the conductive member is made of a cross-linked rubber-like elastic material that is conductive all over, and
the conductive cross-linked rubber-like elastic material contains 50 to 90% by volume of conductive fillers.

6. The electrical connection member according to claim 1, wherein
the conductive member comprises
a columnar shape conductive portion made of a conductive rubber-like elastic material and
an insulating portion made of an insulating rubber-like elastic material surrounding a circumference of the columnar shape conductive portion, and
the conductive rubber-like elastic material forming the columnar shape conductive portion contains 25 to 80% by volume of conductive fillers.

7. The electrical connection member according to claim 6, wherein the conductive fillers contained in the conductive rubber-like elastic material forming the columnar shape conductive portion are aligned in a height direction of the columnar shape.

8. The electrical connection member according to claim 1, wherein
a conductible diameter of the conductive member exhibiting conductivity in a compressed direction when applying a load between the upper surface and the lower surface and compressively deforming the conductive member, is in a range of 1.2 mm to 5.0 mm, and wherein
a ratio (an aspect ratio) of a height of the conductive member not in a state of compressive deformation to the conductible diameter of the conductive member is in a range of 0.1 or more and 1.5 or less.

9. The electrical connection member according to claim 1, wherein an upper surface and a lower surface of the connecting member comprise the adhesive members in a vertical direction so that each of an upper surface and a lower surface of the electrical connection member is adhesivable.

10. A glass plate structure with a terminal, comprising a terminal, a glass plate provided with a contact member to be electrically connected to the terminal, and an electrical connection member making electrical connection between the terminal and the contact member,
wherein the electrical connection member making electrical connection between the terminal and the contact member is the electrical connection member according to claim 1, and
wherein the electrical connection is made between the terminal and the contact member through a conductive member in a state of compressive deformation provided in the electrical connection member.

11. The glass plate structure with the terminal according to claim 10, wherein
the contact member, the terminal, and the conductive member are arranged at a position where compressive force in order to apply a load between the upper surface and the lower surface of the conductive member and to put the conductive member into a compressively deformed state is applied by the contact member provided on the glass plate, and the terminal, and wherein
the electrical connection member is adhered to the glass plate provided with the contact member so that an arrangement of the contact member, the terminal and the conductive member is maintained.

12. An electrical connection member comprising a conductive member made of a rubber-like elastic material,
the conductive member having at least an upper surface and a lower surface;
wherein
the electrical connection member comprises an adhesive member and a connecting member connecting the conductive member to the adhesive member; wherein
the connecting member comprises an opening to fix the conductive member; and
wherein
the conductive member is fixed to the connecting member by bringing a side surface of the conductive member into contact with the opening of the connecting member;
wherein a compression set measured after the following treatment is 50% or less, the treatment being applying a load between the upper surface and the lower surface of the conductive member, holding the conductive member at 25% compressive deformation, removing the load applied to release compressive stress, again applying a load between the upper surface and the lower surface of the conductive member, and conducting 25% compressive deformation at 105° C. for 22 hours; and
electric resistance between the upper surface and the lower surface is 0.1 Q or less during application of the load.

13. The electrical connection member according to claim 12, wherein a diameter of the opening of the connecting member is selected from a range of 50% to 200% of a conductible diameter of the conductive member.

14. The electrical connection member according to claim 12, wherein an upper surface and a lower surface of the conductive member fixed in the opening of the connecting member protrude from an upper surface and a lower surface of the connecting member, respectively.

15. The electrical connection member according to claim 12, wherein with respect to a height direction of the side surface of the conductive member, a portion brought into contact with the opening of the connecting member includes a middle position of a height of the side surface.

16. The electrical connection member according to claim 12, wherein
the conductive member is made of a cross-linked rubber-like elastic material that is conductive all over, and
the conductive cross-linked rubber-like elastic material contains 50 to 90% by volume of conductive fillers.

17. The electrical connection member according to claim 12, wherein
the conductive member comprises
a columnar shape conductive portion made of a conductive rubber-like elastic material and an insulating portion made of an insulating rubber-like elastic material surrounding a circumference of the columnar shape conductive portion, and the conductive rubber-like elastic material forming the columnar shape conductive portion contains 25 to 80% by volume of conductive fillers.

18. The electrical connection member according to claim 17, wherein the conductive fillers contained in the conductive rubber-like elastic material forming the columnar shape conductive portion are aligned in a height direction of the columnar shape.

19. The electrical connection member according to claim 12, wherein a conductible diameter of the conductive member exhibiting conductivity in a compressed direction when applying a load between the upper surface and the lower surface and compressively deforming the conductive member, is in a range of 1.2 mm to 5.0 mm, and wherein a ratio (an aspect ratio) of a height of the conductive member not in a state of compressive deformation to the conductible diameter of the conductive member is in a range of 0.1 or more and 1.5 or less.

* * * * *